United States Patent
Hu et al.

(10) Patent No.: US 11,956,715 B2
(45) Date of Patent: Apr. 9, 2024

(54) COMMUNICATIONS METHOD AND APPARATUS

(71) Applicant: Huawei Technologies Co., Ltd., Shenzhen (CN)

(72) Inventors: Hao Hu, Shenzhen (CN); Zhongding Lei, Singapore (SG); Rong Wu, Shenzhen (CN); Bo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 207 days.

(21) Appl. No.: 17/452,185

(22) Filed: Oct. 25, 2021

(65) Prior Publication Data
US 2022/0046532 A1     Feb. 10, 2022

Related U.S. Application Data

(63) Continuation of application No. PCT/CN2019/084657, filed on Apr. 26, 2019.

(51) Int. Cl.
*H04W 4/00*        (2018.01)
*H04W 8/12*        (2009.01)
*H04W 12/041*     (2021.01)
*H04W 12/0431*    (2021.01)
(Continued)

(52) U.S. Cl.
CPC ............ *H04W 48/18* (2013.01); *H04W 8/12* (2013.01); *H04W 12/041* (2021.01); *H04W 12/0431* (2021.01); *H04W 60/04* (2013.01)

(58) Field of Classification Search
CPC ..... H04W 72/04; H04W 72/12; H04W 72/50; H04W 12/041; H04W 12/0431; H04W 48/18
See application file for complete search history.

(56) References Cited

U.S. PATENT DOCUMENTS

| | | | |
|---|---|---|---|
| 10,193,689 B2 * | 1/2019 | Resch | H04L 9/0894 |
| 11,290,876 B2 * | 3/2022 | You | H04W 12/037 |
| 2019/0029065 A1 * | 1/2019 | Park | H04W 48/02 |

(Continued)

FOREIGN PATENT DOCUMENTS

| | | |
|---|---|---|
| CN | 109417709 A | 3/2019 |
| CN | 109429214 A | 3/2019 |

(Continued)

OTHER PUBLICATIONS

3GPP TS 23.501 V16.0.2 (Apr. 2019), 3rd Generation Partnership Project, Technical Specification Group Services and System Aspects, System Architecture for the 5G System, Stage 2 (Release 16), Sophia Antipolis, Valbonne, France, 317 pages.

(Continued)

*Primary Examiner* — Shantell L Heiber
(74) *Attorney, Agent, or Firm* — Slater Matsil, LLP

(57) ABSTRACT

A terminal device obtains first slice selection assistance information, where the first slice selection assistance information is obtained by encrypting second slice selection assistance information, and the second slice selection assistance information is selection assistance information of a slice to which the terminal device is allowed to access. The terminal device sends a registration request message to an access network device, where the registration request message includes the first slice selection assistance information.

20 Claims, 12 Drawing Sheets

(51) Int. Cl.
*H04W 48/18* (2009.01)
*H04W 60/04* (2009.01)

(56) References Cited

U.S. PATENT DOCUMENTS

| | | | | |
|---|---|---|---|---|
| 2019/0274039 | A1* | 9/2019 | Prasad | H04W 12/37 |
| 2020/0145818 | A1 | 5/2020 | Lee et al. | |
| 2021/0289351 | A1* | 9/2021 | Ferdi | H04W 12/02 |
| 2021/0337380 | A1* | 10/2021 | Ianev | H04W 60/04 |

FOREIGN PATENT DOCUMENTS

| | | |
|---|---|---|
| WO | 2018231028 A1 | 12/2018 |
| WO | 2018231125 A1 | 12/2018 |
| WO | 2018236819 A1 | 12/2018 |
| WO | 2019004929 A2 | 1/2019 |
| WO | 2019063387 A1 | 4/2019 |

OTHER PUBLICATIONS

3GPP TS 23.502 V16.0.2 (Apr. 2019), 3rd Generation Partnership Project, Technical Specification Group Services and System Aspects, Procedures for the 5G System, Stage 2 (Release 16), Sophia Antipolis, Valbonne, France, 419 pages.

3GPP TR 33.811 V15.0.0, (Jun. 2018), 3rd Generation Partnership Project, Technical Specification Group Services and System Aspects, Study on security aspects of 5G network slicing management (Release 15), Sophia Antipolis, Valbonne, France, Total 19 pages.

NEC, "NSSAI protection during the RRC connection establishment procedure", 3GPP TSG-SA WG3 Meeting #94 Ad-Hoc, S3-190656, Stockholm, Sweden, Mar. 11-15, 2019, 2 pages.

Qualcomm Incorporated, "Proposed solution for protecting the S-NSSAI for transmission at the AS layer", 3GPP TSG-SA WG3 Meeting #94Ad-Hoc, S3-190791, Stockholm, Sweden, Mar. 11-15, 2019, 2 pages.

* cited by examiner

COMMUNICATIONS METHOD AND APPARATUS

CROSS-REFERENCE TO RELATED APPLICATIONS

This application is a continuation of International Application No. PCT/CN2019/084657, filed on Apr. 26, 2019, which is hereby incorporated by reference in its entirety.

TECHNICAL FIELD

This application relates to the field of wireless communications technologies, and in particular, to a communications method and apparatus.

BACKGROUND

When requesting to access a slice, a terminal device needs to send network slice selection assistance information (NSSAI) to a base station, where the NSSAI may include a slice/service type (SST) and a slice differentiator (SD) of a to-be-accessed slice. After receiving the NSSAI, the base station may select, based on the NSSAI and a local policy, an appropriate access and mobility management function (AMF) network element to provide a slice service for the terminal device. In addition, the base station further performs AMF congestion control based on the NSSAI sent by the terminal device through an access stratum (AS).

If there is no privacy protection method at the AS stratum, privacy leakage and potential threats will occur. Therefore, how to design a method for effectively protecting the NSSAI at the AS stratum without changing an existing security protocol procedure is an urgent problem to be resolved.

SUMMARY

This application provides a communications method and apparatus, to effectively protect NSSAI at an AS stratum without changing an existing security protocol procedure.

According to a first aspect, a communications method is provided. The method includes: A terminal device obtains first slice selection assistance information, where the first slice selection assistance information is obtained by encrypting second slice selection assistance information, and the second slice selection assistance information is selection assistance information of a slice to which the terminal device is allowed to access. The terminal device sends a registration request message to an access network device, where the registration request message includes the first slice selection assistance information.

The method may be performed by a first communications apparatus. The first communications apparatus may be the terminal device or a communications apparatus that can support the terminal device in implementing a function required for the method. Certainly, the first communications apparatus may alternatively be another communications apparatus, for example, a chip system. Herein, an example in which the first communications apparatus is the terminal device is used.

According to the foregoing method, the terminal device may send encrypted slice selection assistance information to the access network device by using the registration request message, so that slice selection assistance information at an AS stratum can be effectively protected without changing an existing security protocol procedure.

In a possible implementation, manners in which the terminal device obtains the first slice selection assistance information may include, but are not limited to, the following manners.

Manner 1: The terminal device generates the first slice selection assistance information based on the second slice selection assistance information.

Manner 2: The terminal device receives the first slice selection assistance information from a mobility management network element.

The manner 1 and the manner 2 are separately described below in this embodiment of this application.

Based on the manner 1, in a possible implementation, the terminal device generates the first slice selection assistance information based on the second slice selection assistance information, a first function, and a first random number (RAND).

Based on the manner 1, in a possible implementation, before the terminal device generates the first slice selection assistance information based on the second slice selection assistance information, the first function, and the first RAND, manners in which the terminal device obtains the first RAND may further include, but are not limited to, the following manners.

Manner 1: The terminal device receives the first RAND from a mobility management network element.

Manner 2: The terminal device receives a second RAND from a mobility management network element, and generates the first RAND based on the second RAND and a first key.

Based on the manner 2, in a possible implementation, before generating the first RAND based on the second RAND and the first key, the terminal device may derive the first key based on a locally stored second key.

Based on the manner 1, in a possible implementation, the terminal device may further receive a third RAND from the mobility management network element, where the third RAND is used to update the first RAND or the second RAND. Based on this implementation, when the third RAND is used to update the first RAND, the terminal device generates third slice selection assistance information based on the second slice selection assistance information, the first function, and the third RAND. Alternatively, when the third RAND is used to update the second RAND, the terminal device generates fourth slice selection assistance information based on the second slice selection assistance information, the first function, the first key, and the third RAND; and the terminal device updates the first slice selection assistance information by using the fourth slice selection assistance information.

Based on the manner 2, in a possible implementation, the terminal device receives a first correspondence from the mobility management network element, where the first correspondence includes a correspondence between the first slice selection assistance information and the second slice selection assistance information.

Based on the manner 2, in a possible implementation, the terminal device may further receive third slice selection assistance information from the mobility management network element, where the third slice selection assistance information is used to update the first slice selection assistance information. The terminal device updates the first slice selection assistance information by using the third slice selection assistance information.

Based on the manner 2, in a possible implementation, the terminal device may receive a second correspondence from the mobility management network element, where the second correspondence includes a correspondence between the second slice selection assistance information and the third slice selection assistance information.

In a possible implementation, the first function includes an encryption function, or the first function includes correspondences between a plurality of RANDs and a plurality of first mappings, where each first mapping includes mapping relationships between a plurality of pieces of first slice selection assistance information and a plurality of pieces of second slice selection assistance information, mapping relationships between a plurality of pieces of third slice selection assistance information and a plurality of pieces of second slice selection assistance information, and/or mapping relationships between a plurality of pieces of fourth slice selection assistance information and a plurality of pieces of second slice selection assistance information.

According to a second aspect, a communications method is provided. The method includes: An access network device receives a first registration request message from a terminal device, where the first registration request message includes first slice selection assistance information, the first slice selection assistance information is obtained by encrypting second slice selection assistance information, and the second slice selection assistance information is selection assistance information of a slice to which the terminal device is allowed to access. The access network device generates the second slice selection assistance information based on the first slice selection assistance information, and sends a second registration request message to a mobility management network element, where the second registration request message includes the second slice selection assistance information.

The method may be performed by a second communications apparatus. The second communications apparatus may be the access network device or a communications apparatus that can support the access network device in implementing a function required for the method. Certainly, the second communications apparatus may alternatively be another communications apparatus, for example, a chip system. Herein, an example in which the second communications apparatus is the access network device is used.

According to the foregoing method, when sending slice selection assistance information to the access network device through an AS stratum, the terminal device may send encrypted slice selection assistance information. After receiving the encrypted slice selection assistance information, the access network device may decrypt the slice selection assistance information, and send decrypted slice selection assistance information to the mobility management network element. In this way, the slice selection assistance information at the AS stratum can be protected. Therefore, leakage of user privacy and slice information can be avoided without reducing availability of the slice selection assistance information for the access network device.

In a possible implementation, the access network device may generate the second slice selection assistance information based on the first slice selection assistance information, a first function, and a first RAND.

In a possible implementation, before the access network device generates the second slice selection assistance information based on the first slice selection assistance information, the first function, and the first RAND, methods used by the access network device to obtain the first RAND may further include, but are not limited to, the following methods.

Method 1: The access network device receives the first RAND from the mobility management network element.

Method 2: The access network device receives a second RAND and a first key from the mobility management network element, and generates the first RAND based on the second RAND and the first key.

In a possible implementation, the access network device may further receive a third RAND from the mobility management network element, where the third RAND is used to update the first RAND or the second RAND.

In a possible implementation, the first function includes an encryption function, or the first function includes correspondences between a plurality of RANDs and a plurality of first mappings, where each first mapping includes mapping relationships between a plurality of pieces of first slice selection assistance information and a plurality of pieces of second slice selection assistance information.

According to a third aspect, a communications method is provided. The method includes: A mobility management network element receives a registration request message from a terminal device, where the registration request message includes selection assistance information of a slice to which access is requested. The mobility management network element sends a registration accept message to the terminal device after establishing a security context, where the registration accept message includes first slice selection assistance information, the first slice selection assistance information is obtained by encrypting second slice selection assistance information, and the second slice selection assistance information is selection assistance information of a slice to which the terminal device is allowed to access.

The method may be performed by a third communications apparatus. The third communications apparatus may be the mobility management network element or a communications apparatus that can support the mobility management network element in implementing a function required for the method. Certainly, the third communications apparatus may alternatively be another communications apparatus, for example, a chip system. Herein, an example in which the third communications apparatus is the mobility management network element is used.

According to the foregoing method, when sending allowed slice selection assistance information to the terminal device, the mobility management network element sends encrypted slice selection assistance information. In this way, when subsequently initiating a registration request again, the terminal device may send the encrypted slice selection assistance information to the access network device through an AS stratum, so that the slice selection assistance information at the AS stratum can be protected. Therefore, leakage of user privacy and slice information can be avoided.

In a possible implementation, before sending the registration accept message to the terminal device, the mobility management network element may further determine the second slice selection assistance information based on the selection assistance information of the slice to which access is requested, and generate the first slice selection assistance information based on the second slice selection assistance information.

In a possible implementation, manners in which the mobility management network element generates the first slice selection assistance information based on the second slice selection assistance information may include, but are not limited to, the following manners. The mobility management network element generates a first RAND, and generates the first slice selection assistance information based on the second slice selection assistance information, a first function, and the first RAND.

In a possible implementation, the mobility management network element may further generate a first correspondence based on the first slice selection assistance information and the second slice selection assistance information, and store the first correspondence, where the first correspondence includes a correspondence between the first slice selection assistance information and the second slice selection assistance information.

In a possible implementation, the registration accept message includes the first correspondence, and the first slice selection assistance information is included in the first correspondence.

In a possible implementation, the mobility management network element may further send the first RAND to an access network device accessed by the terminal device.

In a possible implementation, the mobility management network element may further generate a second RAND, where the second RAND is used to update the first RAND. The mobility management network element generates third slice selection assistance information based on the second slice selection assistance information, the first function, and the second RAND, where the third slice selection assistance information is used to update the first slice selection assistance information. The mobility management network element sends the third slice selection assistance information to the terminal device.

In a possible implementation, the mobility management network element may further generate a second correspondence based on the second slice selection assistance information and the third slice selection assistance information, and store the second correspondence, where the second correspondence includes a correspondence between the second slice selection assistance information and the third slice selection assistance information. Based on this implementation, the mobility management network element may further send the second correspondence to the terminal device.

In a possible implementation, the mobility management network element may send the second RAND to the access network device accessed by the terminal device.

In a possible implementation, the first function includes an encryption function, or the first function includes correspondences between a plurality of RANDs and a plurality of first mappings, where each first mapping includes mapping relationships between a plurality of pieces of first slice selection assistance information and a plurality of pieces of second slice selection assistance information and/or mapping relationships between a plurality of pieces of third slice selection assistance information and a plurality of pieces of second slice selection assistance information.

According to a fourth aspect, a communications method is provided. The method includes: A mobility management network element generates a first RAND or a second RAND. The mobility management network element sends the first RAND or the second RAND to a terminal device.

The method may be performed by a third communications apparatus. The third communications apparatus may be the mobility management network element or a communications apparatus that can support the mobility management network element in implementing a function required for the method. Certainly, the third communications apparatus may alternatively be another communications apparatus, for example, a chip system. Herein, an example in which the third communications apparatus is the mobility management network element is used.

According to the foregoing method, the mobility management network element may send the first RAND or the second RAND to the terminal device, so that the terminal device can generate encrypted slice selection assistance information based on the first RAND or the second RAND. In this way, the terminal device may subsequently send the encrypted slice selection assistance information to an access network device through an AS stratum, so that the slice selection assistance information at the AS stratum can be protected. Therefore, leakage of user privacy and slice information can be avoided.

In a possible implementation, the mobility management network element may further send the first RAND to an access network device accessed by the terminal device. Alternatively, the mobility management network element sends the second RAND and a first key to an access network device accessed by the terminal device.

In a possible implementation, the mobility management network element may further send a third RAND to the terminal device or the access network device accessed by the terminal device, where the third RAND is used to update the first RAND or the second RAND.

According to a fifth aspect, this application provides a communications apparatus. The apparatus has a function of implementing the method according to any one of the foregoing aspects or the implementations of the foregoing aspects. The function may be implemented by hardware, or may be implemented by hardware executing corresponding software. The hardware or the software includes one or more modules corresponding to the function.

According to a sixth aspect, this application provides a communications apparatus. The apparatus includes a processor and a memory. The memory is configured to store computer-executable instructions. When the apparatus runs, the processor executes the computer-executable instructions stored in the memory, to enable the apparatus to perform the method according to any one of the foregoing aspects or the implementations of the foregoing aspects.

According to a seventh aspect, this application provides a communications apparatus. The apparatus includes units or means configured to perform the steps in any one of the foregoing aspects.

According to an eighth aspect, this application provides a communications apparatus. The apparatus includes a processor and an interface circuit. The processor is configured to: communicate with another apparatus through the interface circuit, and perform any method according to any one of the foregoing aspects. There are one or more processors.

According to a ninth aspect, this application provides a communications apparatus. The apparatus includes a processor, configured to: be connected to a memory; and invoke a program stored in the memory, to perform the method according to any one of the implementations of the foregoing aspects. The memory may be located inside the apparatus, or may be located outside the apparatus. In addition, there are one or more processors.

According to a tenth aspect, this application further provides a computer-readable storage medium. The computer-readable storage medium stores instructions. When the instructions are run on a computer, a processor is enabled to perform the method according to any one of the foregoing aspects.

According to an eleventh aspect, this application further provides a computer program product including instructions. When the computer program product runs on a computer, the computer is enabled to perform the method according to any one of the foregoing aspects.

According to a twelfth aspect, this application further provides a chip system. The system includes a processor, configured to perform the method according to the foregoing aspects.

According to a thirteenth aspect, this application further provides a communications system. The system includes at least two of the terminal device configured to perform the method according to any one of the first aspect or the implementations of the first aspect, the access network device configured to perform the method according to any one of the second aspect or the implementations of the second aspect, the mobility management network element configured to perform the method according to any one of the third aspect or the implementations of the third aspect, or the mobility management network element configured to perform the method according to any one of the fourth aspect or the implementations of the fourth aspect.

DETAILED DESCRIPTION OF ILLUSTRATIVE EMBODIMENTS

To make objectives, technical solutions, and advantages of this application clearer, the following further describes this application in detail with reference to the accompanying drawings. A specific operation method in a method embodiment may also be used in an apparatus embodiment or a system embodiment. In descriptions of this application, unless otherwise specified, "a plurality of" means two or more than two, and "at least one" means one or more than two. In addition, it should be understood that, in descriptions of embodiments of this application, terms such as "first" and "second" are only used for a purpose of distinction description, and shall not be understood as an indication or implication of relative importance, or an indication or implication of an order.

Figure 1:
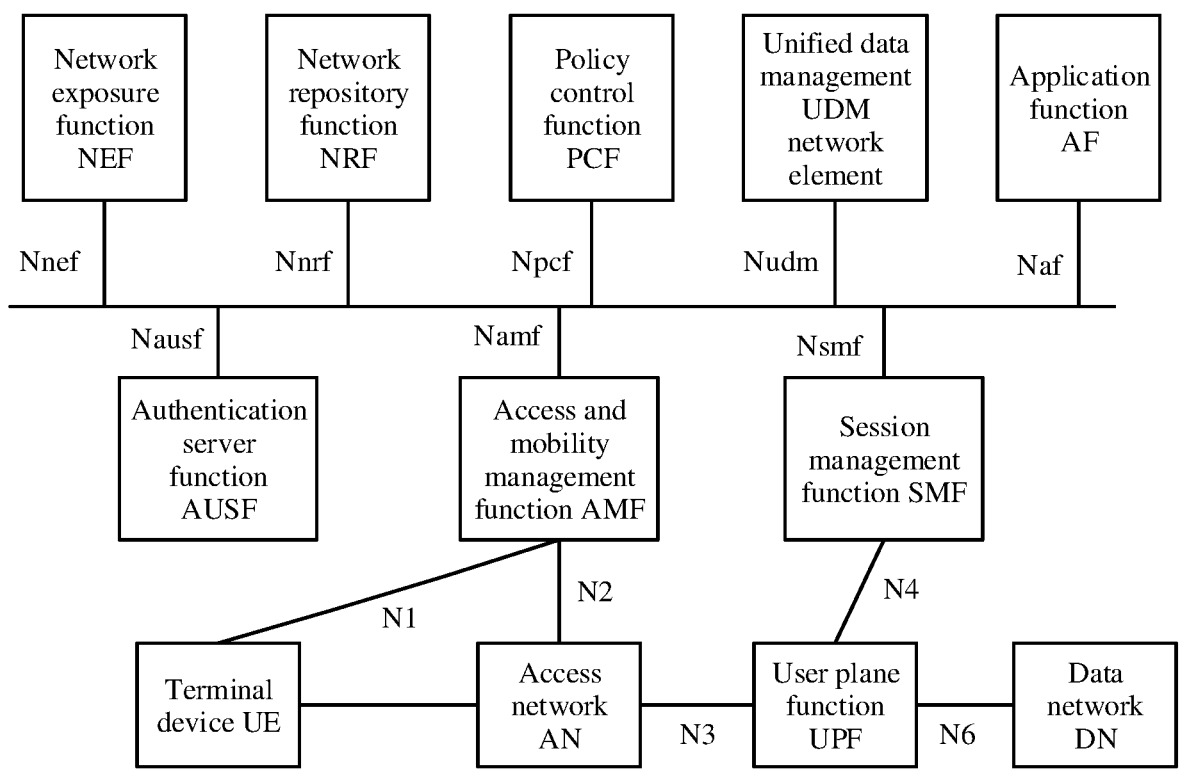
FIG. 1 is a schematic diagram of a network architecture according to an embodiment of this application.

FIG. 1 is a schematic diagram of a 5th-generation (5G) network architecture that is based on a service-oriented architecture. The 5G network architecture shown in FIG. 1 may include three parts: a terminal device, a data network (DN), and an operator network.

The operator network may also be referred to as a mobile communications network, and is mainly a network in which a mobile network operator (MNO) provides a mobile broadband access service for a user. The operator network described in the embodiments of this application may be specifically a network that meets a requirement of a 3rd generation partnership project (3GPP) standard, which is referred to as a 3GPP network. Usually, the 3GPP network is operated by an operator, and includes but is not limited to a 5G network, a 4th-generation mobile communications technology (4G) network, a 3rd-generation mobile communications technology (3G) network, a 2nd-generation wireless telephone technology (2G) network, and the like. In this application, an example in which the operator network is the 5G network is used as an example in FIG. 1.

A 5G operator network may include a network exposure function (NEF) network element, a network repository function (NRF) network element, a policy control function (PCF) network element, a unified data management (UDM) network element, an application function (AF) network element, an authentication server function (AUSF) network element, an access and mobility management function (AMF) network element, a session management function (SMF) network element, a (radio) access network ((R)AN), a user plane function (UPF) network element, and the like. In the foregoing operator network, the parts other than the (radio) access network are referred to as core networks. For ease of description, an AN is used as an example for subsequent description in the embodiments of this application.

The terminal device in this application may provide voice and/or data services, and may be a wired or wireless terminal device. The wireless terminal device may be a mobile phone, a computer, a tablet computer, a personal digital assistant (PDA), a mobile internet device (MID), a wearable device, an e-book reader, or the like. For another example, the wireless terminal device may be a mobile station or an access point. User equipment (UE) is a type of terminal device, and is a term in a long term evolution (LTE) system. For convenience, the terminal device is used as an example for subsequent description.

The terminal device may establish a connection to the operator network through an interface (for example, N1) provided by the operator network, and use a service such as data and/or voice provided by the operator network. The terminal device may further access the DN through the operator network, and use an operator service deployed on the DN and/or a service provided by a third party. The third party may be a service provider other than the operator network and the terminal device, and may provide another service such as data and/or voice for the terminal device. A specific representation form of the third party may be specifically determined based on an actual application scenario. This is not limited herein.

The AN is a sub-network of the operator network, and is an implementation system between a service node in the operator network and the terminal device. To access the operator network, the terminal device passes through the AN, and then may be connected to the service node in the operator network through the AN. An AN device in this application is a device that provides a wireless communications function for the terminal device. The access network device includes but is not limited to: a next-generation base station (gNodeB, gNB) in 5G, an evolved NodeB (eNB), a radio network controller (RNC), a NodeB (NB), a base station controller (BSC), a base transceiver station (BTS), a home base station (for example, a home evolved NodeB, or a home NodeB (HNB)), a baseband unit (BBU), a transmission reception point (TRP), a transmission point (TP), a mobile switching center, and the like.

The AMF network element is a control plane network element provided by the operator network, and is responsible for access control and mobility management for accessing the operator network by the terminal device, for example, including functions such as mobility status management, allocation of a temporary user identity, and user authentication and authorization.

The SMF network element is a control plane network element provided by the operator network, and is responsible for managing a protocol data unit (PDU) session of the terminal device. The PDU session is a channel used to transmit a PDU, and the terminal device needs to transmit a PDU to the DN through the PDU session. The SMF network element is responsible for establishment, maintenance, deletion, and the like of the PDU session. The SMF network element includes functions related to a session, for example, session management (for example, session establishment, modification, and release, including tunnel maintenance between the UPF and the AN), selection and control of the UPF network element, service and session continuity (SSC) mode selection, and roaming.

The UPF network element is a gateway provided by the operator, and is a gateway for communication between the operator network and the DN. The UPF network element includes functions related to a user plane, for example, data packet routing and transmission, packet detection, service usage reporting, quality of service (QoS) processing, lawful interception, uplink packet detection, and downlink data packet storage.

The DN may also be referred to as a packet data network (PDN), and is a network located outside the operator network. The operator network may access a plurality of DNs, and a plurality of services may be deployed on the DNs, to provide a service such as data and/or voice for the terminal device. For example, the DN is a private network of a smart factory, a sensor installed in a workshop of the smart factory may be a terminal device, a control server of the sensor is deployed on the DN, and the control server may provide a service to the sensor. The sensor may communicate with the control server, to obtain instructions of the control server, transmit collected sensor data to the control server according to the instructions, and so on. For another example, the DN is an internal office network of a company, a mobile phone or a computer of an employee of the company may be a terminal device, and the mobile phone or the computer of the employee may access information, data resources, and the like on the internal office network of the company.

The UDM network element is a control plane network element provided by the operator, and is responsible for storing information such as a subscription permanent identifier (SUPI), a credential, a security context, and subscription data of a subscriber in the operator network. The information stored in the UDM network element may be used for authentication and authorization when the terminal device accesses the operator network. The subscriber in the operator network may be specifically a user using a service provided by the operator network, for example, a user using a SIM card of China Telecom or a user using a SIM card of China Mobile. The SUPI of the subscriber may be a number of the SIM card or the like. The credential and the security context of the subscriber may be stored small files such as an encryption key of the SIM card or information related to encryption of the SIM card, and are used for authentication and/or authorization. The security context may be cookie, a token, or the like stored in a local terminal (for example, a mobile phone) of the user. The subscription data of the subscriber may be a supporting service of the SIM card, for example, a traffic package or a used network of the SIM card. It should be noted that the permanent identifier, the credential, the security context, the cookie, and the token are equivalent to information related to authentication and authorization, and are not limited or distinguished between each other for ease of description in this application document of the present invention. Unless otherwise specified, the security context is used as an example for description in this embodiment of this application. However, this embodiment of this application is also applicable to authentication information and/or authorization information described in another manner.

The AUSF network element is a control plane network element provided by the operator, and is usually used for primary authentication, namely, authentication between the terminal device (subscriber) and the operator network. After receiving an authentication request initiated by the subscriber, the AUSF network element may perform authentication and/or authorization on the subscriber by using authentication information and/or authorization information stored in the UDM network element, or generate authentication information and/or authorization information of the subscriber through the UDM network element. The AUSF network element may feed back the authentication information and/or the authorization information to the subscriber.

The NEF network element is a control plane network element provided by the operator. The NEF network element securely exposes an external interface of the operator network to the third party. When the SMF network element needs to communicate with a third-party network element, the NEF network element may serve as a relay for communication between the SMF network element and the third-party network element. When the NEF network element serves as the relay, the NEF network element may translate identification information of the subscriber and identification information of the third-party network element. For example, when the NEF sends the SUPI of the subscriber from the operator network to the third party, the NEF may translate the SUPI into an external identity (identity, ID) corresponding to the subscriber. When the NEF network element sends an external ID (an ID of the third-party network element) to the operator network, the NEF network element may translate the external ID into the SUPI.

The PCF network element is a control plane function provided by the operator, and is configured to provide a policy of the PDU session for the SMF network element. The policy may include a charging-related policy, a QoS-related policy, an authorization-related policy, and the like.

A network slice selection function (NSSF) network element (not shown in the figure) is responsible for determining a network slice instance (NSI), selecting the AMF network element, and the like.

It should be noted that the network element in this embodiment of this application may also be referred to as a function or a function entity. This is not limited in this application. For example, a mobility management network element may also be referred to as a mobility management function or a mobility management function entity, and the session management function network element may be referred to as a session management function or a session management function entity.

In FIG. 1, Nnef, Nausf, Nnrf, Npcf, Nudm, Naf, Namf, Nsmf, N1, N2, N3, N4, and N6 are interface sequence numbers. For meanings of these interface sequence numbers, refer to meanings defined in the 3GPP standard protocol. This is not limited herein.

The mobility management network element in this application may be the AMF network element shown in FIG. 1, or may be a network element that is in a future communications system and that has a function of the AMF network element. Alternatively, the mobility management network element in this application may be a mobility management entity (MME) in LTE, or the like. In this application, the access network device may be a next generation radio access network (NG-RAN) in the 5G network. The NG-RAN includes but is not limited to the gNB in 5G, the RNC, the TRP, or the like. In future communications (for example, in 6G or another network), the access network device may still be the NG-RAN, or have another name. This is not limited in this application. Alternatively, the access network device in this application may be the eNB in LTE, the NB, or the like.

For ease of description, an example in which the mobility management network element is the AMF, an example in which the access network device is the NG-RAN, and an example in which the terminal device is the UE are used for subsequent description in this application. In other words, in subsequent description of this application, the AMF may be replaced with the mobility management network element, the UE may be replaced with the terminal device, and the NG-RAN may be replaced with the access network device.

For ease of understanding the content of this application, the following describes some communications terms used in this application. It should be noted that this part of content also serves as a part of invention content of this application.

"A slice" in this application may also be referred to as "a network slice" or "a network slice instance", and "the slice", "the network slice", and "the network slice instance" have a same meaning.

Currently, various scenarios have different requirements on a 3GPP ecosystem, such as requirements on charging, policy, security, and mobility. The 3GPP emphasizes that network slices do not affect each other. For example, a large quantity of burst meter reading services should not affect normal mobile broadband services. To meet diversified requirements and slice isolation, independent management and operation and maintenance are required for services, and customized service functions and analysis capabilities are provided. Instances of different service types are deployed on different network slices, and different instances of a same service type may also be deployed on different network slices.

A slice in the 5G network is a virtual private network including a group of network functions or sub-networks. For example, the slice may include the AN, the AMF, the SMF, and the UPF in FIG. 1. In FIG. 1, only one network function of each type is schematically illustrated. During actual network deployment, there may be a plurality of, dozens of, or hundreds of network functions or sub-networks of each type. Many network slices can be deployed on the operator network. Each slice may have different performance to meet requirements of different applications and vertical industries. The operator may "customize" a slice based on requirements of customers from different vertical industries. The operator may alternatively allow some industrial customers to enjoy relatively large autonomy and participate in some slice management and control functions. Slice-level authentication is a network control function in which the industry customers participate. That is, authentication and authorization are performed on a terminal user that requests to access the slice.

When the network slice is deployed on a network, and a user initially attaches to (or referred to as registers with) the network, a network slice selection process is triggered. The network slice selection process depends on subscription data of the user, local configuration information, a roaming agreement, an operator policy, and the like. In the network slice selection process, the foregoing parameters need to be comprehensively considered to select an optimal slice type for the UE. When the optimal slice type is selected for the UE, the UE can access the slice service.

When the UE needs to access the network slice, the UE may provide requested network slice information to the core network, so that the core network selects a network slice instance for the UE. The network slice information may be requested network slice selection assistance information (requested network slice selection assistance information, requested NSSAI). The requested NSSAI includes one or more pieces of single network slice selection assistance information (S-NSSAI). Each piece of S-NSSAI is used to identify a single network slice type, and may alternatively be understood as that the S-NSSAI is used to identify a single network slice, or may be understood as that the S-NSSAI is identification information of a single network slice. Because the NSSAI includes one or more pieces of S-NSSAI, in the following descriptions, the NSSAI may be replaced with S-NSSAIs or S-NSSAI.

After the UE registers with the network, a core network element (for example, the AMF, the NSSF, or the UDM) performs comprehensive determining based on information such as subscription data of the UE, NSSAI of the UE (for example, requested NSSAI, requested S-NSSAIs, or requested S-NSSAI of the UE), a roaming agreement, and local configuration, selects, for the UE, a network slice allowed to be accessed, and may send allowed network slice selection assistance information (allowed NSSAI) to the UE. The allowed network slice selection assistance information may be represented by allowed NSSAI, allowed S-NSSAIs, or allowed S-NSSAI. The allowed S-NSSAI is S-NSSAI allowed, by the current operator network, to be accessed. For ease of description, the following uses an example in which the allowed network slice selection assistance information is represented by the allowed S-NSSAIs for description.

After receiving the allowed S-NSSAIs, the UE may request to access these slices, and send the allowed S-NS-SAIs to the NG-RAN (for example, the gNB). After receiving the allowed S-NSSAIs, the NG-RAN may select an appropriate AMF based on the allowed S-NSSAIs to provide the slice service for the UE. In addition, the NG-RAN further performs AMF congestion control based on the allowed S-NSSAIs sent by the UE through the access stratum (AS).

If there is no privacy protection method at the AS stratum, privacy leakage and potential threats will occur. For example, an eavesdropper may determine whether a police station exists in an area by intercepting the allowed S-NS-SAIs at the AS stratum. For another example, the eavesdropper may alternatively determine, by intercepting the allowed S-NSSAIs at the AS stratum, a type of a slice recently accessed by a user, to infer a recent behavior of the user. Therefore, how to design a method for effectively protecting the allowed S-NSSAIs at the AS stratum without changing the existing security protocol procedure is an urgent problem to be resolved.

To resolve the foregoing problem, this application provides a plurality of communications methods, to effectively protect the allowed S-NSSAIs at the AS stratum without changing the existing security protocol procedure. Details are described below.

Figure 2:
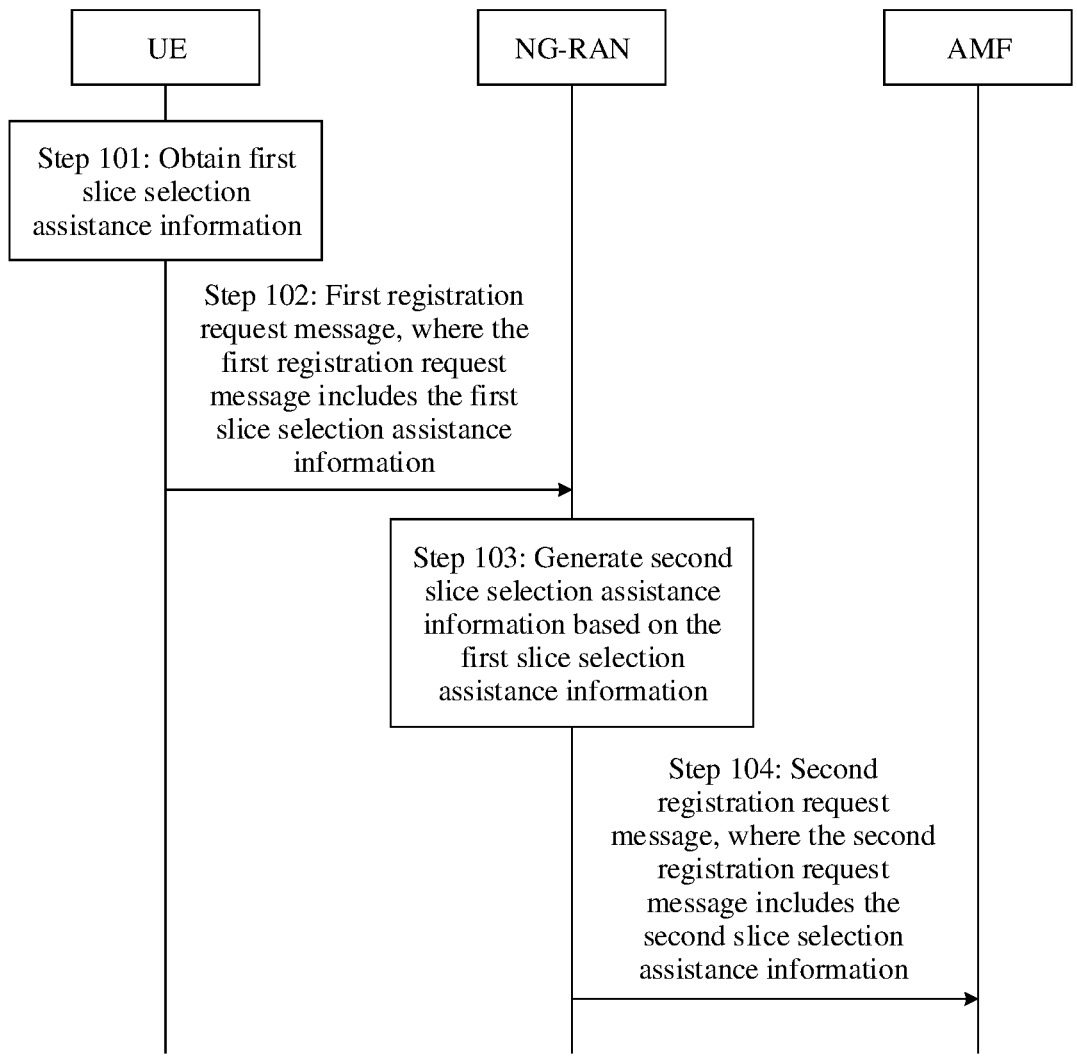
FIG. 2 is a schematic flowchart of a communications method according to an embodiment of this application.

Based on the network architecture shown in FIG. 1, FIG. 2 is a schematic flowchart of a communications method according to this application. In FIG. 2, an example in which a mobility management network element is an AMF, an access network device is an NG-RAN, and a terminal device is UE is used for description. The method includes the following steps.

Step 101: The UE obtains first slice selection assistance information.

The first slice selection assistance information is obtained by encrypting second slice selection assistance information, or the first slice selection assistance information is obtained through operation by using second slice selection assistance information as an input.

The second slice selection assistance information is selection assistance information of a slice to which the UE is allowed to access. For example, the second slice selection assistance information may be allowed S-NSSAIs or allowed NSSAI. When the second slice selection assistance information is the allowed S-NSSAIs or the allowed NSSAI, for ease of description, the first slice selection assistance information may be correspondingly described as temporary selection assistance information allowed T-S-NSSAIs or allowed T-NSSAI of the slice to which the UE is allowed to access.

In this embodiment of this application, manners in which the UE obtains the first slice selection assistance information may include, but are not limited to, the following two manners.

In the first manner, the UE generates the first slice selection assistance information based on the second slice selection assistance information.

Based on the first manner, manners in which the UE generates the first slice selection assistance information based on the second slice selection assistance information may include, but are not limited to, the following manners.

Figure 3:
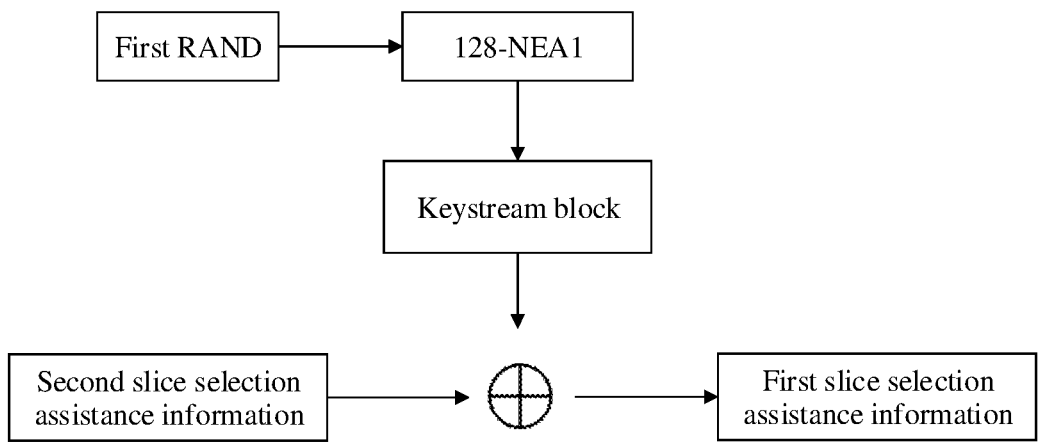
FIG. 3 is a schematic diagram of generating first slice selection assistance information according to an embodiment of this application.

Manner 1: The UE generates the first slice selection assistance information based on the second slice selection assistance information, a first function, and a first random number (RAND). The first function may be a public function pre-stored in the UE. For example, the second slice selection assistance information is the allowed S-NSSAIs, and the first function is $f$. The UE may generate the first slice selection assistance information (which may be denoted as the allowed T-S-NSSAIs) based on the allowed S-NSSAIs, $f$, and the first RAND, that is, Allowed T-S-NSSAIs=$f_{First\ RAND}$ (allowed S-NSSAIs). For another example, as shown in FIG. 3, the first function is a 128-bit new air interface encryption algorithm 1 (128-NEA1). Manners in which the UE generates the first slice selection assistance information may include, but are not limited to, the following manner: The UE inputs the first RAND into the 128-NEA1, to generate a keystream block (keystream block), and generates the first slice selection assistance information by performing exclusive OR on the keystream block and the second slice selection assistance information.

Optionally, based on the manner 1, the first function may be an encryption function.

Based on the manner 1, in a possible implementation, before the UE generates the first slice selection assistance information based on the second slice selection assistance information, the first function, and the first RAND, manners in which the UE obtains the first RAND may further include, but are not limited to, the following manners.

Manner 1a: The UE receives the first RAND from the AMF.

Figure 4:
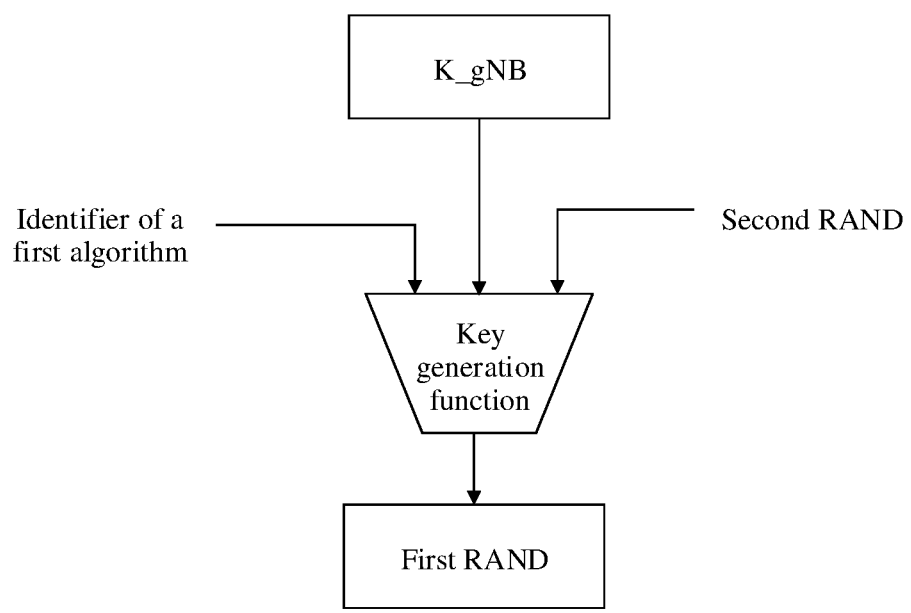
FIG. 4 is a schematic diagram of generating a first RAND according to an embodiment of this application.

Manner 1b: The UE receives a second RAND from the AMF, and generates the first RAND based on the second RAND and a first key. For example, the first key may be a base station basic root key K_gNB. For example, as shown in FIG. 4, the first key is K_gNB. The UE may generate the first RAND based on the second RAND and the first key by using K_gNB and a first algorithm, for example, the 128-NEA1, that is supported by a specific standard selected by the AMF.

Optionally, the UE may receive the first RAND or the second RAND from the AMF by using a registration accept message.

Based on the foregoing manner 1b, in a possible implementation, before generating the first RAND based on the second RAND and the first key, the UE may further derive the first key based on a locally stored second key. For example, the first key is K_gNB. The UE may derive K_gNB based on a locally stored AMF basic root key K_AMF.

Based on the foregoing manner 1a, in a possible implementation, the AMF may initiate a procedure of updating the first RAND. For example, the AMF sends a third RAND to the UE. Correspondingly, the UE receives the third RAND from the AMF, where the third RAND is used to update the first RAND. After receiving the third RAND, the UE may generate third slice selection assistance information based on the second slice selection assistance information, the first function, and the third RAND, and then may update the first slice selection assistance information by using the third slice selection assistance information.

Based on the foregoing manner 1b, in a possible implementation, the AMF may initiate a procedure of updating the second RAND. For example, the AMF sends a third RAND to the UE. Correspondingly, the UE receives the third RAND from the AMF, where the third RAND is used to update the second RAND. After receiving the third RAND, the UE may generate fourth slice selection assistance information based on the second slice selection assistance information, the first function, the first key, and the third RAND, and then may update the first slice selection assistance information by using the fourth slice selection assistance information.

Optionally, the AMF may send the third RAND to the UE by using a UE configuration update command.

Manner 2: The UE generates the first slice selection assistance information based on the second slice selection assistance information, a first RAND, and correspondences between a plurality of RANDs and a plurality of first mappings, where each first mapping includes mapping relationships between a plurality of pieces of first slice selection assistance information and a plurality of pieces of second slice selection assistance information. Based on the manner 2, the correspondences between a plurality of RANDs and a plurality of first mappings may be understood as a first function in this application. In other words, the first function is formed by the correspondences between a plurality of RANDs and a plurality of first mappings. It may be understood that, in the manner 2, the first function is mapping relationships or correspondences. The correspondences between a plurality of RANDs and a plurality of first mappings may be pre-stored in the UE.

Based on the manner 2, in a possible implementation, before generating the first slice selection assistance information based on the second slice selection assistance information, the first RAND, and the correspondences between a plurality of RANDs and a plurality of first mappings, the UE may further obtain the first RAND in the foregoing manner 1a or manner 1b.

With reference to the foregoing manner 2 and manner 1a, in a possible implementation, the AMF may initiate a procedure of updating the first RAND. For example, the AMF sends a third RAND to the UE. Correspondingly, the UE receives the third RAND from the AMF, where the third RAND is used to update the first RAND. After receiving the third RAND, the UE may generate fifth slice selection assistance information based on the second slice selection assistance information, the correspondences between a plurality of RANDs and a plurality of first mappings, and the third RAND, and then may update the first slice selection assistance information by using the fifth slice selection assistance information.

With reference to the foregoing manner 2 and manner 1b, in a possible implementation, the AMF may initiate a procedure of updating the second RAND. For example, the AMF sends a third RAND to the UE. Correspondingly, the UE receives the third RAND from the AMF, where the third RAND is used to update the second RAND. After receiving the third RAND, the UE may generate sixth slice selection assistance information based on the second slice selection assistance information, the first function, the first key, and the third RAND, and then may update the first slice selection assistance information by using the sixth slice selection assistance information.

Based on the manner 1 or the manner 2, in a possible implementation, the AMF may periodically initiate update of the first RAND or the second RAND based on a first period. For example, the first period may be controlled by a timer. When the timer expires, the AMF may initiate the procedure of updating the first RAND or the second RAND.

Optionally, the AMF may send the third RAND to the UE by using a UE configuration update command.

Based on the manner 2, in a possible implementation, the correspondences between a plurality of RANDs and a plurality of first mappings may be in a form of a list. Table 1 shows the correspondences between a plurality of RANDs and a plurality of first mappings according to this embodiment of this application. In the table 1, an example in which the second slice selection assistance information is the allowed NSSAI, and the first slice selection assistance information is the allowed T-NSSAI is used.

TABLE 1

| RAND | First mapping |
| --- | --- |
| $RAND_1$ | allowed $NSSAI_1 \rightarrow$ allowed $T\text{-}NSSAI_1$; allowed $NSSAI_2 \rightarrow$ allowed $T\text{-}NSSAI_2$; allowed $NSSAI_3 \rightarrow$ allowed $T\text{-}NSSAI_3$; ... |
| $RAND_2$ | allowed $NSSAI_1 \rightarrow$ allowed $T\text{-}NSSAI_2$; allowed $NSSAI_2 \rightarrow$ allowed $T\text{-}NSSAI_3$; allowed $NSSAI_3 \rightarrow$ allowed $T\text{-}NSSAI_4$; ... |
| $RAND_3$ | allowed $NSSAI_1 \rightarrow$ allowed $T\text{-}NSSAI_5$; allowed $NSSAI_2 \rightarrow$ allowed $T\text{-}NSSAI_9$; allowed $NSSAI_3 \rightarrow$ allowed $T\text{-}NSSAI_{20}$; ... |
| ... | ... |

That the UE generates the first slice selection assistance information based on the second slice selection assistance information, the first RAND, and the correspondences between a plurality of RANDs and a plurality of first mappings is described by using the correspondences shown in the table 1 as an example. For example, the second slice selection assistance information is the allowed NSSAI 1, and the first RAND is the RAND 1. The first slice selection assistance information generated by the UE based on the allowed NSSAI 1, the RAND 1, and the correspondences shown in the table 1 is the allowed T-NSSAI 1. For another example, the second slice selection assistance information is the allowed NSSAI 2, and the first RAND is the RAND 2. The first slice selection assistance information generated by the UE based on the allowed NSSAI 2, the RAND 2, and the correspondences shown in the table 1 is the allowed T-NSSAI 3. For another example, the second slice selection assistance information is the allowed NSSAI 3, and the first RAND is the RAND 3. The first slice selection assistance information generated by the UE based on the allowed NSSAI 3, the RAND 3, and the correspondences shown in the table 1 is the allowed T-NSSAI 20. The table 1 is merely an example of the correspondences between a plurality of RANDs and a plurality of first mappings. This is not limited.

In the second manner, the AMF sends the first slice selection assistance information to the UE. Correspondingly, the UE receives the first slice selection assistance information from the AMF. For example, the UE may receive the first slice selection assistance information from the AMF by using a registration accept message.

In the second manner, before sending the first slice selection assistance information to the UE, the AMF may generate the first slice selection assistance information based on the second slice selection assistance information.

Manners in which the AMF generates the first slice selection assistance information based on the second slice selection assistance information may include, but are not limited to, the following manners.

Manner (1): The AMF generates a first RAND, and generates the first slice selection assistance information based on the second slice selection assistance information, a first function, and the first RAND. The first function may be a public function pre-stored in the AMF. For example, the second slice selection assistance information is the allowed S-NSSAIs, and the first function is $f$. The AMF may generate the first slice selection assistance information (which may be denoted as the allowed T-S-NSSAIs) based on the allowed S-NSSAIs, $f$, and the first RAND, that is, Allowed T-S-NSSAIs=$f_{First\ RAND}$ (allowed S-NSSAIs).

Based on the manner (1), in a possible implementation, the AMF may initiate a procedure of updating the first slice selection assistance information. For example, the AMF generates a first RAND', where the first RAND' is used to update the first RAND. The AMF generates seventh slice selection assistance information based on the second slice selection assistance information, the first function, and the first RAND', where the seventh slice selection assistance information is used to update the first slice selection assistance information. The AMF sends the seventh slice selection assistance information to the UE. In this way, the UE may update the first slice selection assistance information by using the seventh slice selection assistance information. For example, the second slice selection assistance information is the allowed S-NSSAIs, and the first function is $f$. The AMF may generate the seventh slice selection assistance information (which may be denoted as allowed T-S-NSSAIs') based on the allowed S-NSSAIs, $f$, and the first RAND', that is, Allowed T-S-NSSAIs'=$f_{First\ RAND'}$ (allowed S-NSSAIs). In this way, the AMF may send the allowed T-S-NSSAIs' to the UE, so that the UE updates the first slice selection assistance information by using the allowed T-S-NSSAIs'.

Optionally, the AMF may send the seventh slice selection assistance information to the UE by using a UE configuration update command (UE configuration update command).

Manner (2): The AMF generates a first RAND, and generates the first slice selection assistance information based on the second slice selection assistance information, correspondences between a plurality of RANDs and a plurality of first mappings, and the first RAND. The correspondences between a plurality of RANDs and a plurality of first mappings may be pre-stored in the AMF. For example, the second slice selection assistance information is the allowed NSSAI 2, the correspondences between a plurality of RANDs and a plurality of first mappings are the correspondences shown in the table 1, and the first RAND is the RAND 3. The first slice selection assistance information generated by the AMF based on the allowed NSSAI 2, the correspondences shown in the table 1, and the RAND 3 is the allowed T-NSSAI 9.

Based on the manner (2), in a possible implementation, the AMF may initiate a procedure of updating the first slice selection assistance information. For example, the AMF generates a first RAND', where the first RAND' is used to update the first RAND. The AMF generates eighth slice selection assistance information based on the second slice selection assistance information, the correspondences between a plurality of RANDs and a plurality of first mappings, and the first RAND', where the eighth slice selection assistance information is used to update the first slice selection assistance information. The AMF sends the eighth slice selection assistance information to the UE. In this way, the UE may update the first slice selection assistance information by using the eighth slice selection assistance information. For example, the second slice selection assistance information is the allowed NSSAI 2, the correspondences between a plurality of RANDs and a plurality of first mappings are the correspondences shown in the table 1, and the first RAND' is the RAND 2. The eighth slice selection assistance information generated by the AMF based on the allowed NSSAI 2, the correspondences shown in the table 1, and the RAND 2 is the allowed T-NSSAI 3. In this way, the allowed T-NSSAI 3 may be used to update the first slice selection assistance information.

Optionally, the AMF may send the eighth slice selection assistance information to the UE by using a UE configuration update command (UE configuration update command).

Based on the manner (1) or the manner (2), the AMF may periodically initiate the procedure of updating the first slice selection assistance information based on a second period. For example, the second period may be controlled by a timer. When the timer expires, the AMF may initiate the procedure of updating the first slice selection assistance information.

Based on the manner (1) or the manner (2), in a possible implementation, the AMF may further generate a first correspondence based on the first slice selection assistance information and the second slice selection assistance information, and store the first correspondence, where the first correspondence includes a correspondence between the first slice selection assistance information and the second slice selection assistance information. For example, the first slice selection assistance information is the allowed T-S-NSSAIs, and the second slice selection assistance information is the allowed S-NSSAIs. The AMF may generate the first correspondence {allowed T-S-NSSAIs, allowed S-NSSAIs} based on the allowed T-S-NSSAIs and the allowed S-NSSAIs.

Optionally, the AMF may send the first slice selection assistance information to the UE by sending the first correspondence to the UE. It may be understood that the first slice selection assistance information is carried in or included in the first correspondence.

Optionally, the AMF may send the first correspondence to the UE by using the registration accept message.

Based on the manner (1), in a possible implementation, the AMF may further generate a second correspondence based on the first slice selection assistance information and the seventh slice selection assistance information, and store the second correspondence, where the second correspondence includes a correspondence between the first slice selection assistance information and the seventh slice selection assistance information.

Optionally, the AMF may send the seventh slice selection assistance information to the UE by sending the second correspondence to the UE. It may be understood that the seventh slice selection assistance information is carried in or included in the second correspondence.

Optionally, the AMF may send the second correspondence to the UE by using the UE configuration update command.

Based on the manner (2), in a possible implementation, the AMF may further generate a third correspondence based on the first slice selection assistance information and the eighth slice selection assistance information, and store the third correspondence, where the third correspondence includes a correspondence between the first slice selection assistance information and the eighth slice selection assistance information.

Optionally, the AMF may send the eighth slice selection assistance information to the UE by sending the third correspondence to the UE. It may be understood that the eighth slice selection assistance information is carried in or included in the third correspondence.

Optionally, the AMF may send the third correspondence to the UE by using the UE configuration update command.

Step 102: The UE sends a first registration request message to the NG-RAN.

Correspondingly, the NG-RAN receives the first registration request message from the UE, where the first registration request message includes the first slice selection assistance information.

Step 103: The NG-RAN generates the second slice selection assistance information based on the first slice selection assistance information.

In this embodiment of this application, corresponding to the two manners in which the UE generates the first slice selection assistance information based on the second slice selection assistance information, the following three manners in which the NG-RAN generates the second slice selection assistance information based on the first slice selection assistance information are correspondingly provided.

Figure 5:
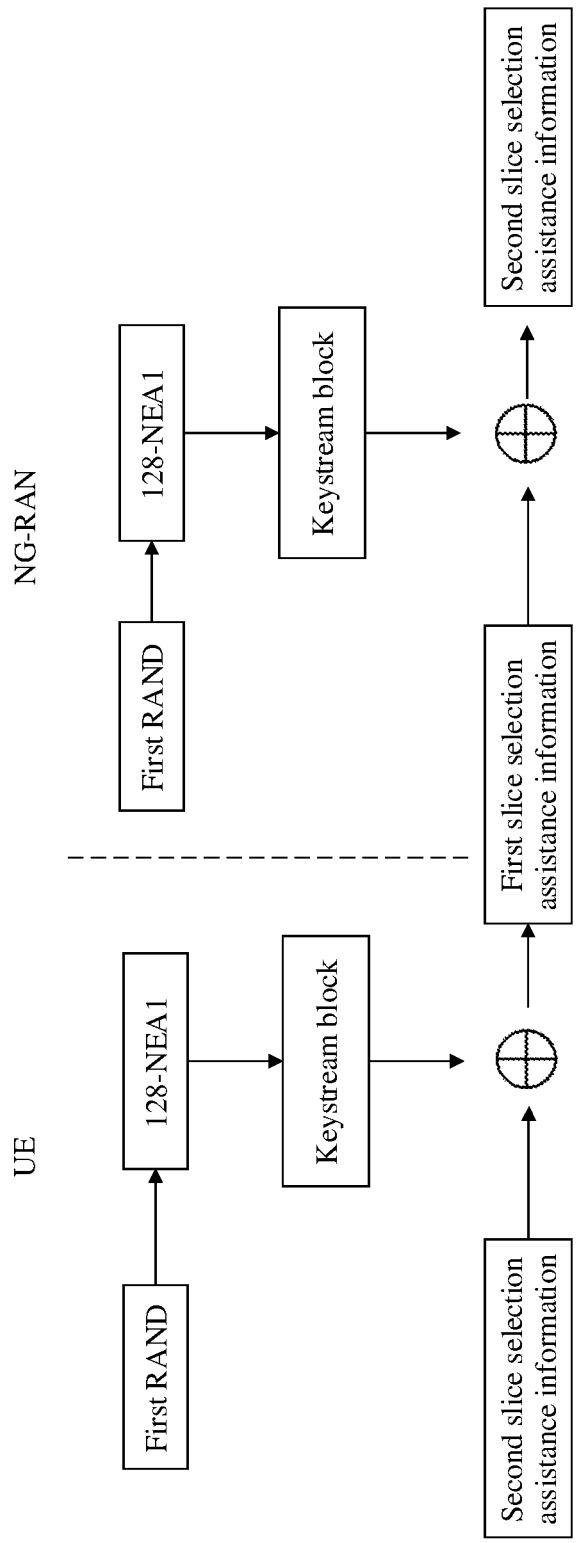
FIG. 5 is a schematic diagram of generating second slice selection assistance information according to an embodiment of this application.

Manner 1: The NG-RAN generates the second slice selection assistance information based on the first slice selection assistance information, the first function, and the first RAND. The first function may be a public function pre-stored in the NG-RAN. For example, as shown in FIG. 5, the first function is the 128-NEA1. When the UE generates the first slice selection assistance information in the following manner: The UE inputs the first RAND into the 128-NEA1, to generate a keystream block; and generates the first slice selection assistance information by performing exclusive OR on the keystream block and the second slice selection assistance information, correspondingly, the NG-RAN may generate the second slice selection assistance information in the following manner: The NG-RAN inputs the first RAND into the 128-NEA1, to generating a keystream block; and generates the second slice selection assistance information by performing exclusive OR on the keystream block and the first slice selection assistance information. It may be understood that the NG-RAN generates the second slice selection assistance information by using an inverse operation of an operation performed by the UE.

Manner 2: The NG-RAN generates the second slice selection assistance information based on the first slice selection assistance information, an inverse function of the first function, and the first RAND. The inverse function of the first function may be a public function pre-stored in the NG-RAN. For example, the first slice selection assistance information is the allowed T-S-NSSAIs, the first function is $f$, and the inverse function of the first function is $f^{-1}$. The NG-RAN may generate the second slice selection assistance information (which may be denoted as the allowed S-NSSAIs) based on the allowed T-S-NSSAIs, $f^{-1}$, and the first RAND, that is, Allowed S-NSSAIs=$f_{First\ RAND}^{-1}$ (allowed T-S-NSSAIs).

Optionally, based on the manner 1 or the manner 2, the first function may be an encryption function.

Manner 3: The NG-RAN generates the second slice selection assistance information based on the first slice selection assistance information, the first RAND, and the correspondences between a plurality of RANDs and a plurality of first mappings. The correspondences between a plurality of RANDs and a plurality of first mappings may be pre-stored in the NG-RAN.

For example, the foregoing manner 3 is described by using an example in which the correspondences between a plurality of RANDs and a plurality of first mappings are the correspondences shown in the table 1. For example, the first slice selection assistance information is the allowed T-NSSAI 3, and the first RAND is the RAND 1. The second slice selection assistance information generated by the UE based on the allowed T-NSSAI 3, the RAND 1, and the correspondences shown in the table 1 is the allowed NSSAI 3. For another example, the first slice selection assistance information is the allowed T-NSSAI 4, and the first RAND is the RAND 2. The second slice selection assistance information generated by the UE based on the allowed T-NSSAI 4, the RAND 2, and the correspondences shown in the table 1 is the allowed NSSAI 3. For another example, the first slice selection assistance information is the allowed T-NSSAI 9, and the first RAND is the RAND 3. The second slice selection assistance information generated by the UE based on the allowed T-NSSAI 9, the RAND 3, and the correspondences shown in the table 1 is the allowed NSSAI 2.

In a possible implementation, before the NG-RAN performs the manner 1, the manner 2, or the manner 3, manners in which the NG-RAN obtains the first RAND may include, but are not limited to, the following manners.

Manner a1: The NG-RAN receives the first RAND from the AMF.

Manner a2: The NG-RAN receives the second RAND and the first key from the AMF, and generates the first RAND based on the second RAND and the first key. For example, the first key may be a base station basic root key K_gNB. When the first key is K_gNB, the NG-RAN may generate the first RAND by using the procedure shown in FIG. 4.

Optionally, the NG-RAN may receive the first RAND, or the second RAND and the first key from the AMF by using a key transfer message.

Based on the foregoing manner a1, in a possible implementation, the AMF may initiate a procedure of updating the first RAND. For example, the AMF sends a third RAND to the NG-RAN. Correspondingly, the NG-RAN receives the third RAND from the AMF, where the third RAND is used to update the first RAND.

Based on the foregoing manner a2, in a possible implementation, the AMF may initiate a procedure of updating the second RAND. For example, the AMF sends a third RAND to the NG-RAN. Correspondingly, the NG-RAN receives the third RAND from the AMF, where the third RAND is used to update the second RAND.

Optionally, the AMF may send the third RAND to the NG-RAN by using an update radio access message (update RAN).

Step 104: The NG-RAN sends a second registration request message to the AMF, where the second registration request message includes the second slice selection assistance information.

According to the method provided in this application, when sending slice selection assistance information to the NG-RAN through an AS stratum, the UE may send encrypted slice selection assistance information. After receiving the encrypted slice selection assistance information, the NG-RAN may decrypt the slice selection assistance information, and send decrypted slice selection assistance information to the AMF. In this way, the slice selection assistance information at the AS stratum can be protected. Therefore, leakage of user privacy and slice information can be avoided without reducing availability of the slice selection assistance information for the NG-RAN. In addition, according to the encryption method in this application, a granularity of slice selection assistance information is used, an encryption function at the AS stratum does not need to be enabled, and only the slice selection assistance information needs to be encrypted. In this way, algorithm overheads are relatively small, and algorithm selection is more flexible.

The following separately describes, by using examples, two methods for obtaining the first slice selection assistance information by the UE provided in this application.

First, a method for generating the first slice selection assistance information by the UE is described by using an example.

Figure 6A:
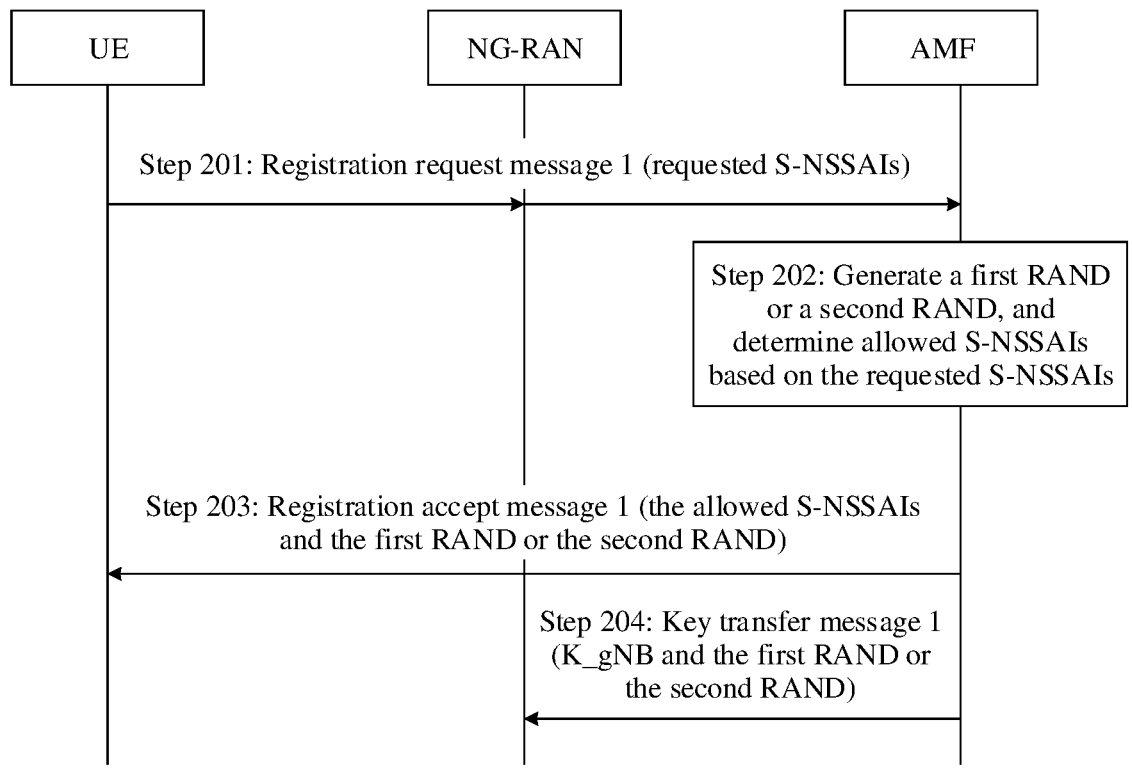
FIG. 6a is a schematic flowchart of another communications method according to an embodiment of this application.

Based on the network architecture shown in FIG. 1, FIG. 6a is a schematic flowchart of a communications method according to an embodiment of this application. In FIG. 6a, an example in which a mobility management network element is an AMF, an access network device is an NG-RAN, and a terminal device is UE is used for description. The method includes the following steps.

Step 201: The UE sends a registration request message 1 to the AMF, and the AMF receives the registration request message 1 from the UE, where the registration request message 1 includes requested S-NSSAIs. For example, the UE may send the registration request message 1 to the AMF through the NG-RAN.

Step 202: The AMF generates a first RAND or a second RAND, and determines allowed S-NSSAIs based on the requested S-NSSAIs.

Optionally, after receiving the requested S-NSSAIs, the AMF may send the requested S-NSSAIs to a UDM or an NSSF. The UDM or the NSSF determines the allowed S-NSSAIs based on the requested S-NSSAIs, and sends the determined allowed S-NSSAIs to the AMF.

Step 203: The AMF sends a registration accept message 1 to the UE, and the UE receives the registration accept message 1 from the AMF, where the registration accept message 1 includes the first RAND and the allowed S-NSSAIs, or the registration accept message 1 includes the second RAND and the allowed S-NSSAIs.

Step 204: The AMF sends a key transfer message 1 to the NG-RAN, and the NG-RAN receives the key transfer message 1 from the AMF, where the key transfer message 1 includes the first RAND and K_gNB, or includes the second RAND and K_gNB.

It should be noted that FIG. 6a is merely an example. In actual application, the method shown in FIG. 6a may alternatively include more or fewer steps. This is not limited in this application.

Figure 6B:
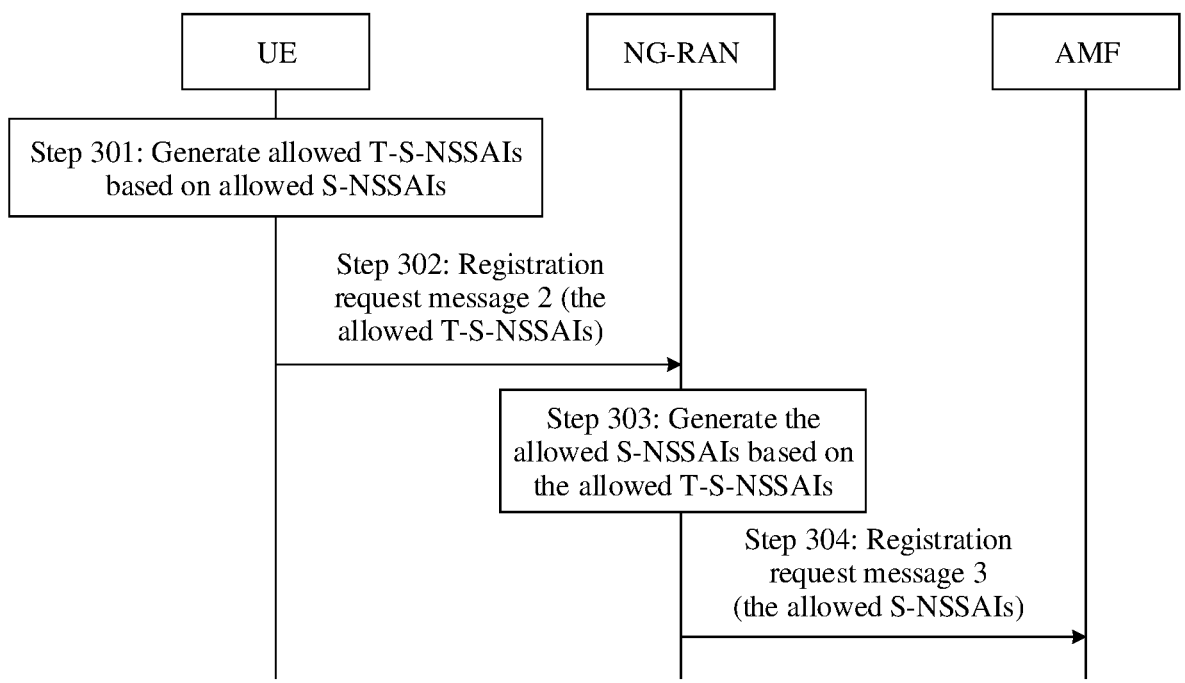
FIG. 6b is a schematic flowchart of still another communications method according to an embodiment of this application.

FIG. 6a describes a procedure in which the UE obtains the first RAND or the second RAND. With reference to FIG. 6b, the following describes a procedure in which the UE generates allowed T-S-NSSAIs based on the obtained allowed S-NSSAIs and uses the allowed T-S-NSSAIs.

Based on the network architecture shown in FIG. 1, FIG. 6b is a schematic flowchart of a communications method according to an embodiment of this application. In FIG. 6b, an example in which a mobility management network element is an AMF, an access network device is an NG-RAN, and a terminal device is UE is used for description. The method includes the following steps.

Step 301: The UE generates allowed T-S-NSSAIs based on allowed S-NSSAIs.

If the UE receives the first RAND in step 203, the UE may generate the allowed T-S-NSSAIs by using the following methods.

Method 1: The UE generates the allowed T-S-NSSAIs based on the allowed S-NSSAIs, a stored first function, and a first RAND. For example, the first function is a public encryption function $f$. The UE may generate the allowed T-S-NSSAIs based on the allowed S-NSSAIs, $f$, and the first RAND, where Allowed T-S-NSSAIs=$f_{First\ RAND}$ (allowed S-NSSAIs).

Method 2: The UE generates the allowed T-S-NSSAIs based on the allowed S-NSSAIs, correspondences between a plurality of RANDs and a plurality of first mappings, and a first RAND. For example, the correspondences between a plurality of RANDs and a plurality of first mappings are the correspondences in the table 1, the allowed S-NSSAIs is allowed NSSAI 3, and the first RAND is the RAND 1 in the table 1. The UE may generate allowed T-NSSAI 3 based on the allowed NSSAI 3, the correspondences in the table 1, and the RAND 1.

If the UE receives the second RAND in step 203, the UE may generate the allowed T-S-NSSAIs by using the following methods.

Method a: The UE may derive K_gNB based on K_AMF, generate the first RAND based on the second RAND and K_gNB, and then generate the allowed T-S-NSSAIs based on the allowed S-NSSAIs, the stored first function, and the first RAND.

Method b: The UE may derive K_gNB based on K_AMF, generate the first RAND based on the second RAND and K_gNB, and then generate the allowed T-S-NSSAIs based on the allowed S-NSSAIs, the correspondences between a plurality of RANDs and a plurality of first mappings, and the first RAND.

Step 302: The UE sends a registration request message 2 to the NG-RAN.

Correspondingly, the NG-RAN receives the registration request message 2 from the UE, where the registration request message 2 includes the allowed T-S-NSSAIs.

Compared with a conventional technology in which a registration request message carries unencrypted allowed S-NSSAIs, according to the method in this application, when initiating a registration procedure, the UE includes encrypted allowed T-S-NSSAIs in the registration request message, to protect the allowed S-NSSAIs. In addition, when the method in this application is applied to the AS stratum, only the allowed S-NSSAIs may be encrypted at the AS stratum, and an encryption function of the AS stratum does not need to be enabled, thereby saving network resources.

Step 303: The NG-RAN generates the allowed S-NSSAIs based on the allowed T-S-NSSAIs.

It may be understood that, corresponding to the encryption method used by the UE, a corresponding decryption method may be used by the NG-RAN.

If the UE generates the allowed T-S-NSSAIs by using the method 1, the NG-RAN may generate the allowed S-NSSAIs based on the allowed T-S-NSSAIs, the stored first function, and the first RAND. For example, the NG-RAN may generate the allowed S-NSSAIs based on the allowed T-S-NSSAIs, the stored first function, and the first RAND by performing an inverse operation of an operation performed when the UE generates the allowed T-S-NSSAIs.

Alternatively, if the UE generates the allowed T-S-NSSAIs by using the method 1, the NG-RAN may generate the allowed S-NSSAIs based on the allowed T-S-NSSAIs, an inverse function of the stored first function, and the first RAND. For example, the inverse function of the first function is a public encryption function $f^{-1}$. The NG-RAN may generate the allowed S-NSSAIs based on the allowed T-S-NSSAIs, $f^{-1}$, and the first RAND, where Allowed S-NSSAIs=$f_{First\ RAND}^{-1}$ (allowed T-S-NSSAIs).

If the UE generates the allowed T-S-NSSAIs by using the method 2, the NG-RAN may generate the allowed S-NSSAIs based on the allowed T-S-NSSAIs, the correspondences between a plurality of RANDs and a plurality of first mappings, and the first RAND. For example, the correspondences between a plurality of RANDs and a plurality of first mappings are the correspondences in the table 1, the allowed T-S-NSSAIs is the allowed T-NSSAI 3, and the first RAND is the RAND 1 in the table 1. The NG-RAN may generate the allowed NSSAI 3 based on the allowed T-NSSAI 3, the correspondences in the table 1, and the RAND 1.

If the UE generates the allowed T-S-NSSAIs by using the method a, the NG-RAN may generate the first RAND based on the second RAND and K_gNB, and then generate the allowed S-NSSAIs based on the allowed T-S-NSSAIs, the stored first function, and the first RAND.

If the UE generates the allowed T-S-NSSAIs by using the method b, the NG-RAN may generate the first RAND based on the second RAND and K_gNB, and then generate the allowed S-NSSAIs based on the allowed T-S-NSSAIs, the correspondences between a plurality of RANDs and a plurality of first mappings, and the first RAND.

Step 304: The NG-RAN sends a registration request message 3 to the AMF, where the registration request message 3 includes the allowed S-NSSAIs.

It should be noted that FIG. 6b is merely an example. In actual application, the method shown in FIG. 6b may alternatively include more or fewer steps. This is not limited in this application.

Figure 6C:
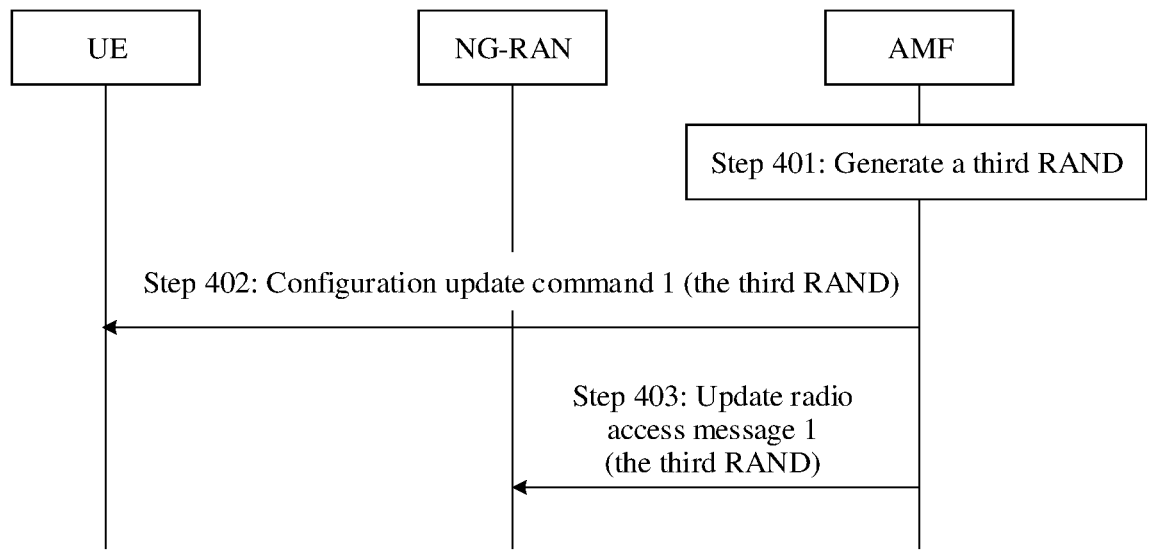
FIG. 6c is a schematic flowchart of still another communications method according to an embodiment of this application.

The following describes an RAND update procedure with reference to FIG. 6c.

Based on the network architecture shown in FIG. 1, FIG. 6c is a schematic flowchart of a communications method according to an embodiment of this application. In FIG. 6c, an example in which a mobility management network element is an AMF, an access network device is an NG-RAN, and a terminal device is UE is used for description. The method includes the following steps.

Step 401: The AMF generates a third RAND.

Step 402: The AMF sends a configuration update command (UE configuration update command) 1 to the UE, where the command 1 includes the third RAND, and the third RAND is used to update a first RAND or a second RAND.

Optionally, when the UE is in connected mode, a timer may be set on a network side. When the timer expires, the foregoing update procedure is initiated.

Step 403: The AMF sends an update radio access message (update RAN) 1 to the NG-RAN, where the update radio access message 1 includes the third RAND, and the third RAND is used to update the first RAND or the second RAND.

It should be noted that, after receiving the third RAND sent by the AMF, the UE may generate new allowed T-S-NSSAIs based on allowed S-NSSAIs, a first function, and the third RAND, and then update the old allowed T-S-NSSAIs by using the new allowed T-S-NSSAIs. When the UE initiates a registration procedure again, the UE may include the new allowed T-S-NSSAIs in a registration request message sent to the NG-RAN. Correspondingly, the NG-RAN may decrypt, by using the foregoing decryption method, the new allowed T-S-NSSAIs by using the third RAND.

It should be noted that FIG. 6c is merely an example. In actual application, the method shown in FIG. 6c may alternatively include more or fewer steps. This is not limited in this application.

Second, a method for receiving the first slice selection assistance information from the AMF by the UE is described by using an example. The method includes the following three procedures.

Figure 7A:
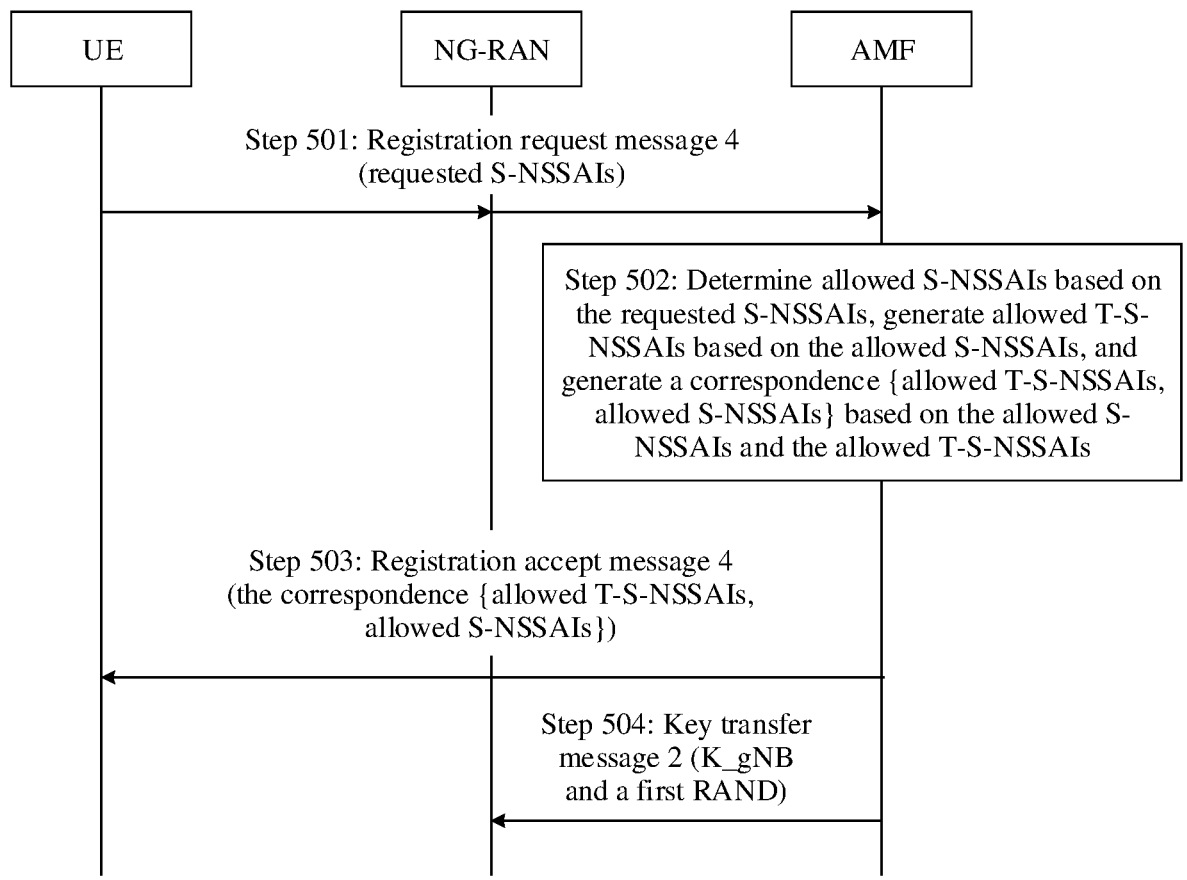
FIG. 7a is a schematic flowchart of still another communications method according to an embodiment of this application.

Based on the network architecture shown in FIG. 1, FIG. 7a is a schematic flowchart of a communications method according to an embodiment of this application. In FIG. 7a, an example in which a mobility management network element is an AMF, an access network device is an NG-RAN, and a terminal device is UE is used for description. The method includes the following steps.

Step 501: The UE sends a registration request message 4 to the AMF, and the AMF receives the registration request message 4 from the UE, where the registration request message 4 includes requested S-NSSAIs. For example, the UE may send the registration request message 4 to the AMF through the NG-RAN.

Step 502: The AMF determines allowed S-NSSAIs based on the requested S-NSSAIs, generates allowed T-S-NSSAIs based on the allowed S-NSSAIs, and generates a correspondence {allowed T-S-NSSAIs, allowed S-NSSAIs} based on the allowed S-NSSAIs and the allowed T-S-NSSAIs.

Optionally, after receiving the requested S-NSSAIs, the AMF may send the requested S-NSSAIs to a UDM or an NSSF. The UDM or the NSSF determines the allowed S-NSSAIs based on the requested S-NSSAIs, and sends the determined allowed S-NSSAIs to the AMF.

Methods used by the AMF to generate the allowed T-S-NSSAIs may include, but are not limited to, the following methods.

Method 1: The AMF generates a first RAND, and generates the allowed T-S-NSSAIs based on the allowed S-NSSAIs, a stored first function, and the first RAND. For example, the first function is a public encryption function $f$. The AMF may generate the allowed T-S-NSSAIs based on the allowed S-NSSAIs, $f$, and the first RAND, where Allowed T-S-NSSAIs=$f_{First\ RAND}$ (allowed S-NSSAIs).

Method 2: The AMF generates a first RAND, and generates the allowed T-S-NSSAIs based on the allowed S-NSSAIs, correspondences between a plurality of RANDs and a plurality of first mappings, and the first RAND. For example, the correspondences between a plurality of RANDs and a plurality of first mappings are the correspondences in the table 1, the allowed S-NSSAIs is allowed NSSAI 3, and the first RAND the RAND 1 in the table 1. The AMF may generate allowed T-NSSAI 3 based on the allowed NSSAI 3, the correspondences in the table 1, and the RAND 1.

Step 503: The AMF sends a registration accept message 4 to the UE, and the UE receives the registration accept message 4 from the AMF, where the registration accept message 4 includes the correspondence {allowed T-S-NSSAIs, allowed S-NSSAIs}.

Step 504: The AMF sends a key transfer message 2 to the NG-RAN, and the NG-RAN receives the key transfer message 2 from the AMF, where the key transfer message 2 includes the first RAND and K_gNB.

It should be noted that FIG. 7a is merely an example. In actual application, the method shown in FIG. 7a may alternatively include more or fewer steps. This is not limited in this application.

Figure 7B:
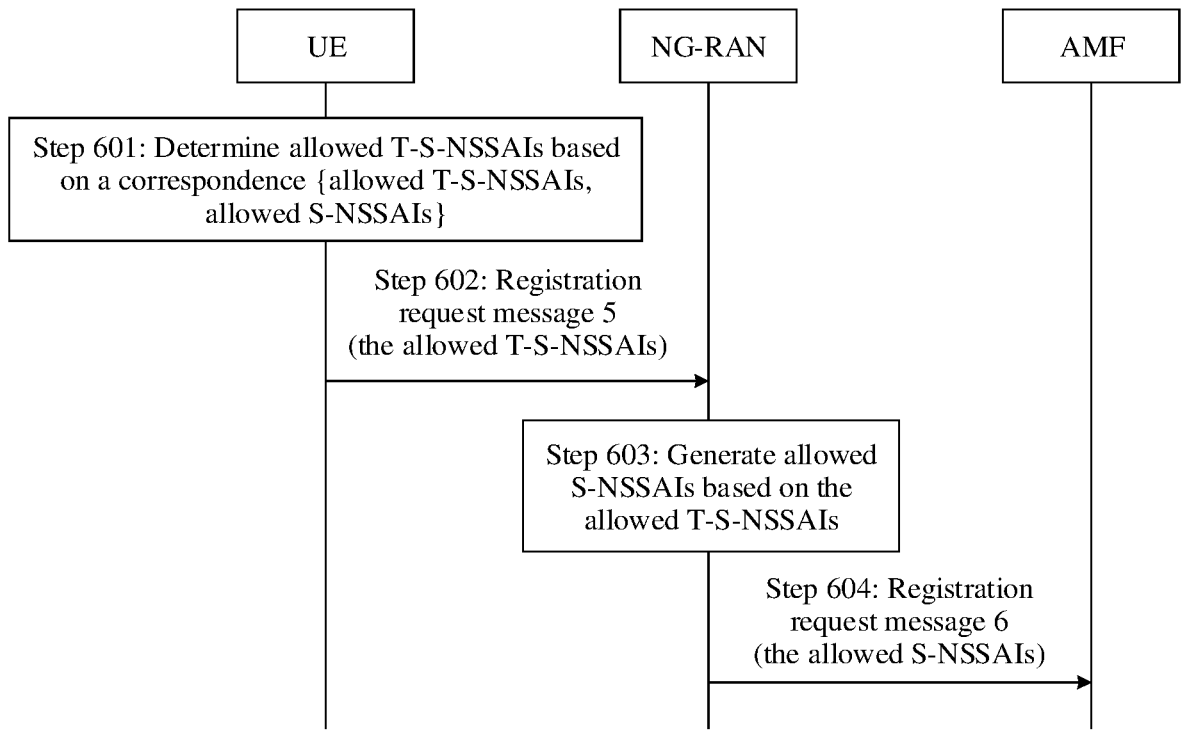
FIG. 7b is a schematic flowchart of still another communications method according to an embodiment of this application.

FIG. 7a describes a procedure in which the UE obtains the correspondence {allowed T-S-NSSAIs, allowed S-NSSAIs}. With reference to FIG. 7b, the following describes a procedure in which the UE uses the correspondence {allowed T-S-NSSAIs, allowed S-NSSAIs}.

Based on the network architecture shown in FIG. 1, FIG. 7b is a schematic flowchart of a communications method according to an embodiment of this application. In FIG. 7b, an example in which a mobility management network element is an AMF, an access network device is an NG-RAN, and a terminal device is UE is used for description. The method includes the following steps.

Step 601: The UE determines, based on a correspondence {allowed T-S-NSSAIs, allowed S-NSSAIs}, allowed T-S-NSSAIs used to initiate a registration request.

Step 602: The UE sends a registration request message 5 to the NG-RAN.

Correspondingly, the NG-RAN receives the registration request message 5 from the UE, where the registration request message 5 includes the allowed T-S-NSSAIs.

Compared with a conventional technology in which a registration request message carries unencrypted allowed S-NSSAIs, according to the method in this application, when initiating a registration procedure, the UE includes encrypted allowed T-S-NSSAIs in the registration request message, to protect the allowed S-NSSAIs. In addition, when the method in this application is applied to the AS stratum, only the allowed S-NSSAIs may be encrypted at the AS stratum, and an encryption function of the AS stratum does not need to be enabled, thereby saving network resources.

Step 603: The NG-RAN generates the allowed S-NSSAIs based on the allowed T-S-NSSAIs.

It may be understood that, corresponding to the encryption method used by the AMF, a corresponding decryption method may be used by the NG-RAN.

If the AMF generates the allowed T-S-NSSAIs by using the method 1, the NG-RAN may generate the allowed S-NSSAIs based on the allowed T-S-NSSAIs, a stored first function, and a first RAND. For example, the NG-RAN may generate the allowed S-NSSAIs based on the allowed T-S-NSSAIs, the stored first function, and the first RAND by performing an inverse operation of an operation performed when the AMF generates the allowed T-S-NSSAIs.

Alternatively, if the AMF generates the allowed T-S-NSSAIs by using the method 1, the NG-RAN may generate the allowed S-NSSAIs based on the allowed T-S-NSSAIs, an inverse function of a stored first function, and a first RAND. For example, the inverse function of the first function is a public encryption function $f^{-1}$. The NG-RAN may generate the allowed S-NSSAIs based on the allowed T-S-NSSAIs, $f^{-1}$, and the first RAND, where Allowed S-NSSAIs=$f_{First\ RAND}^{-1}$ (allowed T-S-NSSAIs).

If the AMF generates the allowed T-S-NSSAIs by using the method 2, the NG-RAN may generate the allowed S-NSSAIs based on the allowed T-S-NSSAIs, correspondences between a plurality of RANDs and a plurality of first mappings, and a first RAND. For example, the correspondences between a plurality of RANDs and a plurality of first mappings are the correspondences in the table 1, the allowed T-S-NSSAIs is allowed T-NSSAI 3, and the first RAND is the RAND 1 in the table 1. The UE may generate allowed NSSAI 3 based on the allowed T-NSSAI 3, the correspondences in the table 1, and the RAND 1.

Step 604: The NG-RAN sends a registration request message 6 to the AMF, where the registration request message 6 includes the allowed S-NSSAIs.

It should be noted that FIG. 7*b* is merely an example. In actual application, FIG. 7*b* may alternatively include more or fewer steps. This is not limited in this application.

Figure 7C:
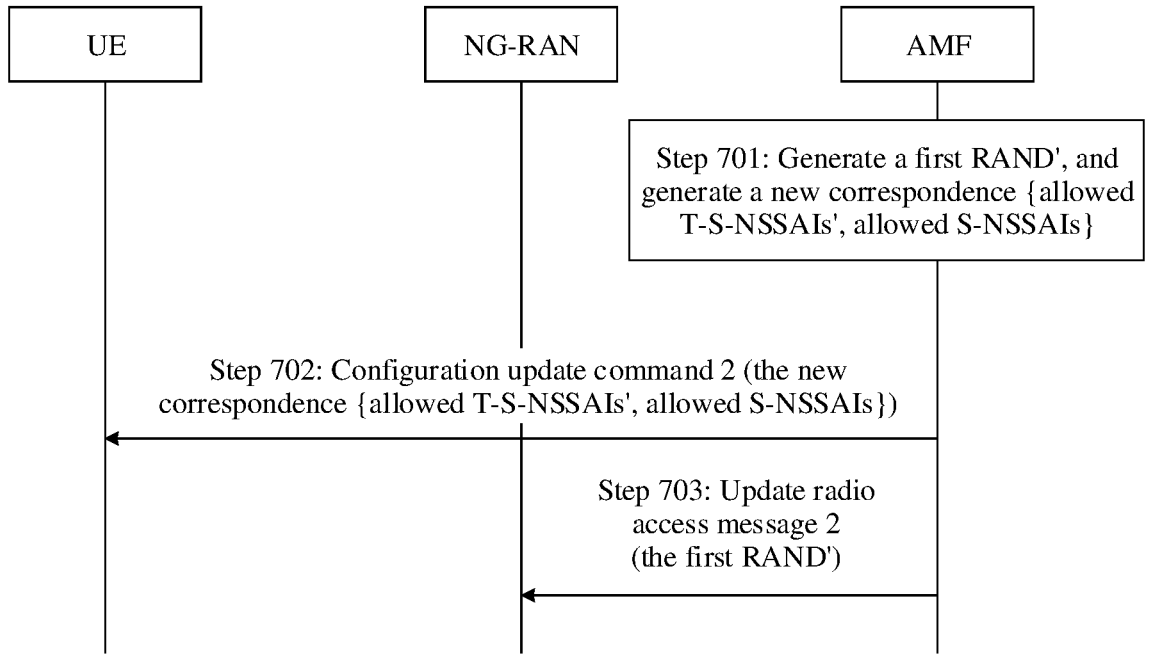
FIG. 7c is a schematic flowchart of still another communications method according to an embodiment of this application.

The following describes a procedure of updating the correspondence {allowed T-S-NSSAIs, allowed S-NSSAIs} with reference to FIG. 7*c*.

Based on the network architecture shown in FIG. 1, FIG. 7*c* is a schematic flowchart of a communications method according to an embodiment of this application. In FIG. 7*c*, an example in which a mobility management network element is an AMF, an access network device is an NG-RAN, and a terminal device is UE is used for description. The method includes the following steps.

Step 701: The AMF generates a first RAND' used to update a first RAND; generates allowed T-S-NSSAIs' based on the first RAND', allowed S-NSSAIs, and a first function, or generates allowed T-S-NSSAIs' based on the first RAND', allowed S-NSSAIs, and an inverse function of a first function, or generates allowed T-S-NSSAIs' based on the first RAND', allowed S-NSSAIs, and correspondences between a plurality of RANDs and a plurality of first mappings; and generates a new correspondence {allowed T-S-NSSAIs', allowed S-NSSAIs} based on the allowed S-NSSAIs and the allowed T-S-NSSAIs'.

Step 702: The AMF sends a configuration update command (UE configuration update command) 2 to the UE, where the command 2 includes the new correspondence {allowed T-S-NSSAIs', allowed S-NSSAIs}.

Optionally, when the UE is in connected mode, a timer may be set on a network side. When the timer expires, the update procedure is initiated.

Step 703: The AMF sends an update radio access message (update RAN) 2 to the NG-RAN, where the update radio access message 2 includes the first RAND'.

It should be noted that, after receiving the new correspondence {allowed T-S-NSSAIs', allowed S-NSSAIs} sent by the AMF, the UE may update an old correspondence {allowed T-S-NSSAIs, allowed S-NSSAIs} based on the new correspondence {allowed T-S-NSSAIs', allowed S-NSSAIs}. When the UE initiates a registration procedure again, the UE may include the allowed T-S-NSSAIs' in a registration request message sent to the NG-RAN. Correspondingly, the NG-RAN may decrypt, by using the foregoing decryption method, the allowed T-S-NSSAIs' by using the first RAND'.

It should be noted that FIG. 7*c* is merely an example. In actual application, the method shown in FIG. 7*c* may alternatively include more or fewer steps. This is not limited in this application.

The foregoing mainly describes the solutions provided in this application from a perspective of interaction between network elements. It may be understood that to implement the foregoing functions, each network element includes a corresponding hardware structure and/or software module for implementing each function. A person skilled in the art should easily be aware that, in combination with the examples described in the embodiments disclosed in this specification, units and algorithm steps may be implemented by hardware or a combination of hardware and computer software in the present invention. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of the present invention.

In the embodiments of this application, the access network device, the terminal device, and the mobility management network element may be divided into functional units based on the foregoing method example. For example, each functional unit may be obtained through division based on each corresponding function, or two or more functions may be integrated into one processing unit. The integrated unit may be implemented in a form of hardware, or may be implemented in a form of a software functional unit.

Based on a same inventive concept, an embodiment of this application further provides an apparatus configured to implement any one of the foregoing methods. For example, an apparatus is provided, and includes units (or means) configured to implement the steps performed by the access network device in any one of the foregoing methods. For another example, another apparatus is further provided, and includes units (or means) configured to implement the steps performed by the terminal device in any one of the foregoing methods. For another example, another apparatus is further provided, and includes units (or means) configured to implement the steps performed by the core network device in any one of the foregoing methods.

Figure 8:
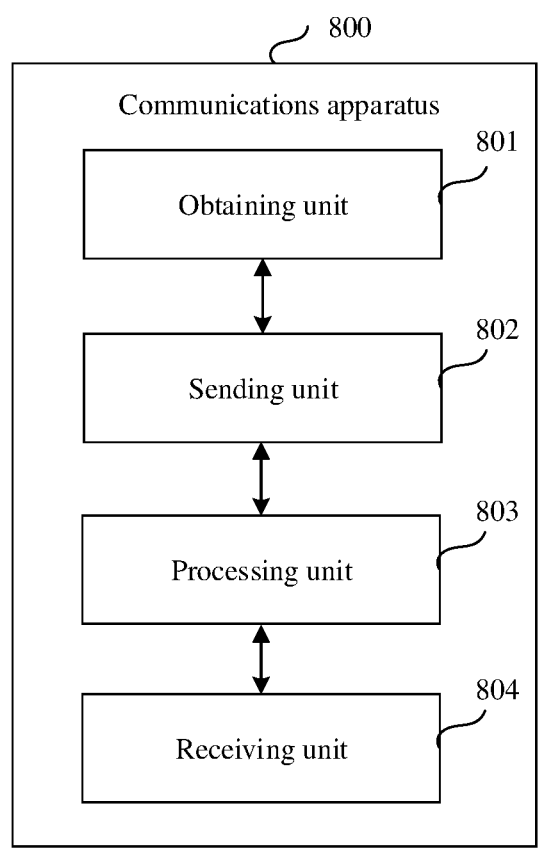
FIG. 8 is a schematic diagram of a structure of a communications apparatus according to an embodiment of this application.

An embodiment of this application provides a communications apparatus 800. The communications apparatus 800 may be used in a terminal device. FIG. 8 is a schematic diagram of a structure of a communications apparatus 800 according to an embodiment of this application. Refer to FIG. 8. The communications apparatus 800 may include an obtaining unit 801 and a sending unit 802. During implementation, the communications apparatus 800 may further include a processing unit 803 and a receiving unit 804. The obtaining unit 801 may be configured to obtain first slice selection assistance information, where the first slice selection assistance information is obtained by encrypting second slice selection assistance information. The sending unit 802 may be configured to send a first registration request message to an access network device, where the first registration request message includes the first slice selection assistance information.

In a possible design, the processing unit 803 may be configured to generate the first slice selection assistance information based on the second slice selection assistance information.

In a possible design, the processing unit 803 is specifically configured to generate the first slice selection assistance information based on the second slice selection assistance information, a first function, and a first random number RAND.

In a possible design, the receiving unit 804 may be configured to receive the first RAND from a mobility management network element. Alternatively, the receiving unit 804 may be configured to receive a second RAND from a mobility management network element. The processing unit 803 may be configured to generate the first RAND based on the second RAND and a first key.

In a possible design, the processing unit 803 may be further configured to derive the first key based on a locally stored second key.

In a possible design, the receiving unit 804 may be configured to receive a third RAND from the mobility management network element, where the third RAND is used to update the first RAND or the second RAND.

When the third RAND is used to update the first RAND, the processing unit 803 may be further configured to generate third slice selection assistance information based on the second slice selection assistance information, the first function, and the third RAND.

Alternatively, when the third RAND is used to update the second RAND, the processing unit 803 may be further configured to generate fourth slice selection assistance information based on the second slice selection assistance information, the first function, the first key, and the third RAND.

The processing unit 803 may be further configured to update the first slice selection assistance information by using the fourth slice selection assistance information.

In a possible design, the receiving unit 804 may be further configured to receive the first slice selection assistance information from a mobility management network element.

In a possible design, the receiving unit 804 is specifically configured to receive a first correspondence from the mobility management network element, where the first correspondence includes a correspondence between the first slice selection assistance information and the second slice selection assistance information.

In a possible design, the receiving unit 804 may be further configured to receive third slice selection assistance information from the mobility management network element, where the third slice selection assistance information is used to update the first slice selection assistance information.

The processing unit 803 may be further configured to update the first slice selection assistance information by using the third slice selection assistance information.

In a possible design, the receiving unit 804 may be further configured to receive a second correspondence from the mobility management network element, where the second correspondence includes a correspondence between the second slice selection assistance information and the third slice selection assistance information.

In a possible design, the first function includes an encryption function, or the first function includes correspondences between a plurality of RANDs and a plurality of first mappings, where each first mapping includes mapping relationships between a plurality of pieces of first slice selection assistance information and a plurality of pieces of second slice selection assistance information, mapping relationships between a plurality of pieces of third slice selection assistance information and a plurality of pieces of second slice selection assistance information, and/or mapping relationships between a plurality of pieces of fourth slice selection assistance information and a plurality of pieces of second slice selection assistance information.

Figure 9:
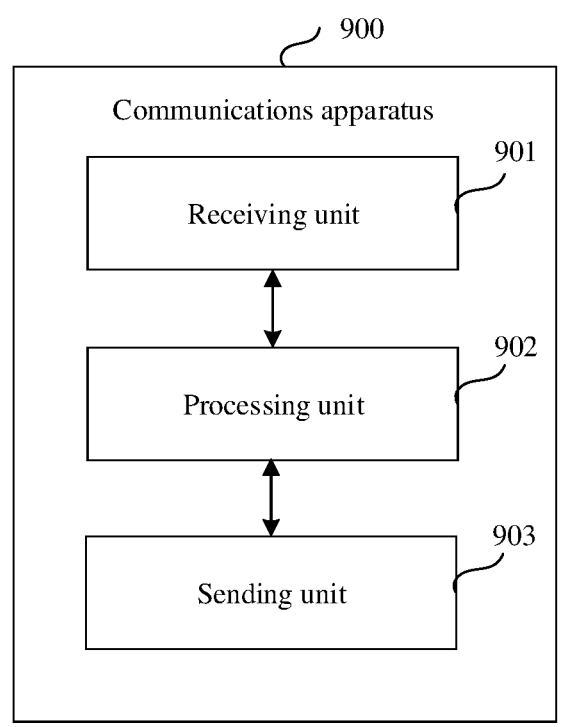
FIG. 9 is a schematic diagram of a structure of still another communications apparatus according to an embodiment of this application.

An embodiment of this application provides a communications apparatus 900. The communications apparatus 900 may be used in an access network device. FIG. 9 is a schematic diagram of a structure of a communications apparatus 900 according to an embodiment of this application. Refer to FIG. 9. The communications apparatus 900 may include a receiving unit 901, a processing unit 902, and a sending unit 903. The receiving unit 901 may be configured to receive a first registration request message from a terminal device, where the first registration request message includes first slice selection assistance information, the first slice selection assistance information is obtained by encrypting second slice selection assistance information, and the second slice selection assistance information is selection assistance information of a slice to which the terminal device is allowed to access. The processing unit 902 may be configured to generate the second slice selection assistance information based on the first slice selection assistance information. The sending unit 903 may be configured to send a second registration request message to a mobility management network element, where the second registration request message includes the second slice selection assistance information.

In a possible design, the processing unit 902 may be specifically configured to: generate the second slice selection assistance information based on the first slice selection assistance information, a first function, and a first random number RAND; or generate the second slice selection assistance information based on the first slice selection assistance information, an inverse function of a first function, and a first random number RAND.

In a possible design, the receiving unit 901 is further configured to: receive the first RAND from the mobility management network element; or receive a second RAND and a first key from the mobility management network element.

The processing unit 902 may be configured to generate the first RAND based on the second RAND and the first key.

In a possible design, the receiving unit 901 is further configured to receive a third RAND from the mobility management network element, where the third RAND is used to update the first RAND or the second RAND.

In a possible design, the first function includes an encryption function, or the first function includes correspondences between a plurality of RANDs and a plurality of first mappings, where each first mapping includes mapping relationships between a plurality of pieces of first slice selection assistance information and a plurality of pieces of second slice selection assistance information.

Figure 10:
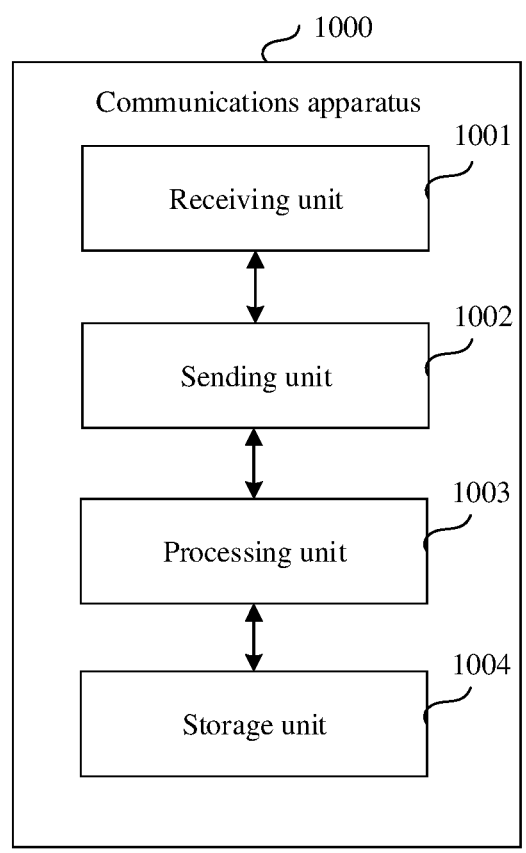
FIG. 10 is a schematic diagram of a structure of still another communications apparatus according to an embodiment of this application.

An embodiment of this application provides a communications apparatus 1000. The communications apparatus 1000 may be used in a mobility management network element. FIG. 10 is a schematic diagram of a structure of a communications apparatus 1000 according to an embodiment of this application. Refer to FIG. 10. The communications apparatus 1000 may include a receiving unit 1001 and a sending unit 1002. During implementation, the communications apparatus 1000 may further include a processing unit 1003 and a storage unit 1004. The receiving unit 1001 may be configured to receive a registration request message from a terminal device, where the registration request message includes selection assistance information of a slice to which access is requested. The sending unit 1002 may be configured to send a registration accept message to the terminal device after establishing a security context, where the registration accept message includes first slice selection assistance information, the first slice selection assistance information is obtained by encrypting second slice selection assistance information, and the second slice selection assistance information is selection assistance information of a slice to which the terminal device is allowed to access.

In a possible design, the processing unit 1003 may be configured to: determine the second slice selection assistance information based on the selection assistance information of the slice to which access is requested; and generate the first slice selection assistance information based on the second slice selection assistance information.

In a possible design, the processing unit 1003 is further configured to: generate a first random number RAND; and generate the first slice selection assistance information based on the second slice selection assistance information, a first function, and the first RAND.

In a possible design, the processing unit 1003 is further configured to generate a first correspondence based on the first slice selection assistance information and the second slice selection assistance information. The storage unit 1004 is configured to store the first correspondence, where the first correspondence includes a correspondence between the first slice selection assistance information and the second slice selection assistance information.

In a possible design, the registration accept message includes the first correspondence, and the first slice selection assistance information is included in the first correspondence.

In a possible design, the sending unit 1002 may be configured to send the first RAND to an access network device accessed by the terminal device.

In a possible design, the processing unit 1003 is further configured to: generate a second RAND, where the second RAND is used to update the first RAND; and generate third slice selection assistance information based on the second slice selection assistance information, the first function, and the second RAND, where the third slice selection assistance information is used to update the first slice selection assistance information. The sending unit 1002 is further configured to send the third slice selection assistance information to the terminal device.

In a possible design, the processing unit 1003 is further configured to generate a second correspondence based on the second slice selection assistance information and the third slice selection assistance information. The storage unit 1004 is further configured to store the second correspondence, where the second correspondence includes a correspondence between the second slice selection assistance information and the third slice selection assistance information. The sending unit 1002 is further configured to send the second correspondence to the terminal device.

In a possible design, the sending unit 1002 is further configured to send the second RAND to the access network device accessed by the terminal device.

In a possible design, the first function includes an encryption function, or the first function includes correspondences between a plurality of RANDs and a plurality of first mappings, where each first mapping includes mapping relationships between a plurality of pieces of first slice selection assistance information and a plurality of pieces of second slice selection assistance information and/or mapping relationships between a plurality of pieces of third slice selection assistance information and a plurality of pieces of second slice selection assistance information.

It should be understood that division into units in the foregoing apparatuses is merely logical function division. During actual implementation, all or some of the units may be integrated into one physical entity, or may be physically separate. In addition, all the units in the apparatus may be implemented by software invoked by a processing element, or may be implemented by hardware; or some units may be implemented by software invoked by a processing element, and some units may be implemented by hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, some or all of the units may be integrated together, or the units may be implemented independently. The processing element herein may also be referred to as a processor, and may be an integrated circuit having a signal processing capability. In an implementation process, the steps in the foregoing methods or the foregoing units may be implemented by using a hardware integrated logic circuit in the processing element, or may be implemented by software invoked by the processing element.

In an example, a unit in any one of the foregoing apparatuses may be one or more integrated circuits configured to implement the foregoing methods, for example, one or more application-specific integrated circuits (ASICs), one or more digital signal processors (DSPs), one or more field programmable gate arrays (FPGAs), or a combination of at least two of the integrated circuits. For another example, when the unit in the apparatus may be implemented by a program invoked by a processing element, the processing element may be a general-purpose processor, for example, a central processing unit (CPU) or another processor that can invoke the program. For another example, the units may be integrated and implemented in a form of a system-on-a-chip (SOC).

The foregoing receiving unit is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

Figure 11:
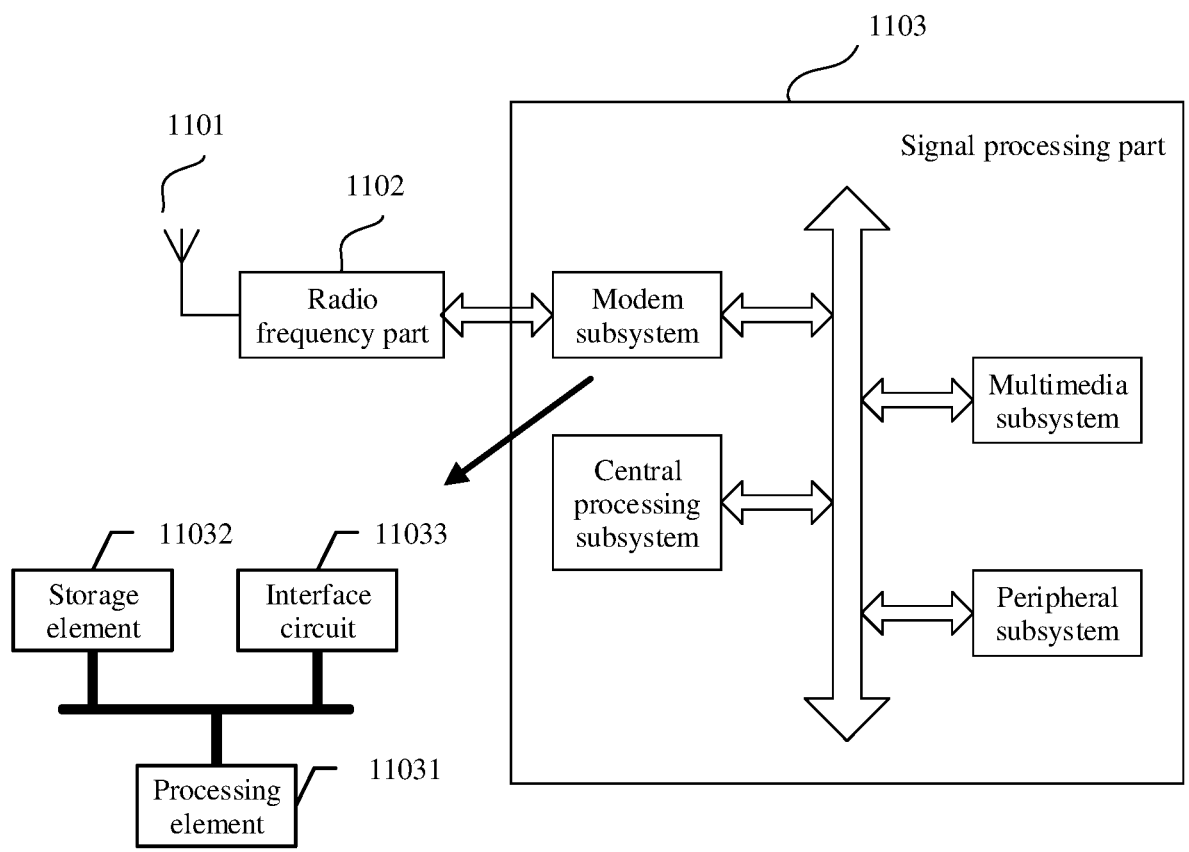
FIG. 11 is a schematic diagram of a structure of a terminal device according to an embodiment of this application.

FIG. 11 is a schematic diagram of a structure of a terminal device according to an embodiment of this application. The terminal device may be the terminal device in the foregoing embodiments, and is configured to implement operations of the terminal device in the foregoing embodiments. As shown in FIG. 11, the terminal device includes an antenna 1101, a radio frequency part 1102, and a signal processing part 1103. The antenna 1101 is connected to the radio frequency part 1102. In a downlink direction, the radio frequency part 1102 receives, through the antenna 1101, information sent by a network device; and sends, to the signal processing part 1103 for processing, the information sent by the network device. In an uplink direction, the signal processing part 1103 processes information of the terminal device, and sends the information to the radio frequency part 1102. The radio frequency part 1102 processes the information of the terminal device, and then sends the processed information to the network device through the antenna 1101.

The signal processing part 1103 may include a modem subsystem, configured to process data at each communications protocol layer. The signal processing part 1103 may further include a central processing subsystem, configured to process an operating system and an application layer of the terminal device. In addition, the signal processing part 1103 may further include another subsystem, for example, a multimedia subsystem or a peripheral subsystem. The multimedia subsystem is configured to control a camera, a screen display, and the like of the terminal device. The peripheral subsystem is configured to implement a connection to another device. The modem subsystem may be an independently disposed chip. Optionally, the foregoing apparatus used in the terminal device may be located in the modem subsystem.

The modem subsystem may include one or more processing elements 11031, for example, a main control CPU and another integrated circuit. In addition, the modem subsystem may further include a storage element 11032 and an interface circuit 11033. The storage element 11032 is configured to store data and a program. However, a program used to perform the methods performed by the terminal device in the foregoing methods may not be stored in the storage element 11032, but is stored in a memory outside the modem subsystem, and is loaded and used by the modem subsystem when to be used. The interface circuit 11033 is configured to communicate with another subsystem. The foregoing apparatus used in the terminal device may be located in the modem subsystem, and the modem subsystem may be implemented by using a chip. The chip includes at least one processing element and an interface circuit. The processing element is configured to perform the steps of any one of the foregoing methods performed by the terminal device. The interface circuit is configured to communicate with another apparatus. In an implementation, units of the terminal device that implement the steps in the foregoing methods may be implemented by a program invoked by a processing element. For example, the apparatus used in the terminal device includes a processing element and a storage element. The processing element invokes a program stored in the storage element, to perform the methods performed by the terminal device in the foregoing method embodiments. The storage element may be a storage element that is on the same chip as the processing unit, namely, an on-chip storage element.

In another implementation, a program used to perform the methods performed by the terminal device in the foregoing methods may be in a storage element that is on a different chip from the processing unit, namely, an off-chip storage element. In this case, the processing element invokes or loads the program from the off-chip storage element to the on-chip storage element, to invoke and perform the methods performed by the terminal device in the foregoing method embodiments.

In still another implementation, units that implement the steps in the foregoing methods and that are in the apparatus used in the terminal device may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

The units of the terminal device that implement the steps in the foregoing methods may be integrated together, and implemented in a form of a system-on-a-chip (system-on-a-chip, SOC). The SOC chip is configured to implement the foregoing methods. At least one processing element and a storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by a program invoked by the processing element, and functions of some units may be implemented by the integrated circuit.

It can be learned that the foregoing apparatus used in the terminal device may include at least one processing element and an interface circuit. The at least one processing element is configured to perform any one of the methods performed by the terminal device provided in the foregoing method embodiments. The processing element may perform some or all steps performed by the terminal device, in a first manner, to be specific, by invoking the program stored in the storage element; or may perform some or all steps performed by the terminal device, in a second manner, to be specific, by using a hardware integrated logic circuit in the processing element in combination with instructions; or may certainly perform, by combining the first manner and the second manner, some or all steps performed by the terminal device.

As described above, the processing element herein may be a general-purpose processor, for example, a CPU, or may be one or more integrated circuits configured to implement the foregoing methods, for example, one or more ASICs, one or more digital signal processors DSPs, one or more FPGAs, or a combination of at least two of the integrated circuits.

The storage element may be a memory, or may be a general term of a plurality of storage elements.

Figure 12:
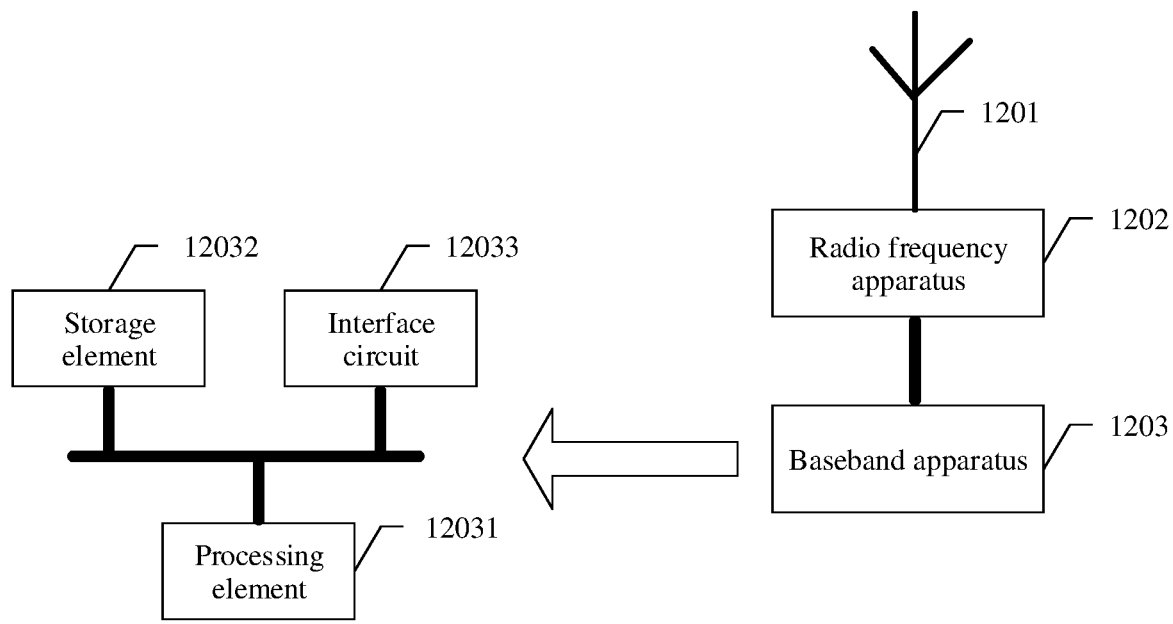
FIG. 12 is a schematic diagram of a structure of an access network device according to an embodiment of this application.

FIG. 12 is a schematic diagram of a structure of an access network device according to an embodiment of this application. The access network device is configured to implement operations of the access network device in the foregoing embodiments. As shown in FIG. 12, the access network device includes an antenna 1201, a radio frequency apparatus 1202, and a baseband apparatus 1203. The antenna 1201 is connected to the radio frequency apparatus

1202. In an uplink direction, the radio frequency apparatus 1202 receives, through the antenna 1201, information sent by a terminal device; and sends, to the baseband apparatus 1203 for processing, the information sent by the terminal device. In a downlink direction, the baseband apparatus 1203 processes information of the terminal device, and sends the information to the radio frequency apparatus 1202. The radio frequency apparatus 1202 processes the information of the terminal device, and then sends the processed information to the terminal device through the antenna 1201.

The baseband apparatus 1203 may include one or more processing elements 12031, for example, a main control CPU and another integrated circuit. In addition, the baseband apparatus 1203 may further include a storage element 12032 and an interface circuit 12033. The storage element 12032 is configured to store a program and data. The interface circuit 12033 is configured to exchange information with the radio frequency apparatus 1202, and the interface circuit is, for example, a common public radio interface (CPRI). The foregoing apparatus used in the access network device may be located in the baseband apparatus 1203. For example, the foregoing apparatus used in the access network device may be a chip in the baseband apparatus 1203. The chip includes at least one processing element and an interface circuit. The processing element is configured to perform the steps of any one of the foregoing methods performed by the access network device. The interface circuit is configured to communicate with another apparatus. In an implementation, units of the access network device that implement the steps in the foregoing methods may be implemented by a program invoked by a processing element. For example, the apparatus used in the access network device includes a processing element and a storage element. The processing element invokes a program stored in the storage element, to perform the methods performed by the access network device in the foregoing method embodiments. The storage element may be a storage element on the same chip as the processing element, namely, an on-chip storage element; or may be a storage element that is on a different chip from the processing element, namely, an off-chip storage element.

In another implementation, units that implement the steps in the foregoing methods and that are in the apparatus used in the access network device may be configured as one or more processing elements. These processing elements are disposed in the baseband apparatus. The processing element herein may be an integrated circuit, for example, one or more ASICs, one or more DSPs, one or more FPGAs, or a combination of these types of integrated circuits. These integrated circuits may be integrated together to form a chip.

The units of the access network device that implement the steps in the foregoing methods may be integrated together, and implemented in a form of a system-on-a-chip (SOC). For example, the baseband apparatus includes the SOC chip, configured to implement the foregoing methods. At least one processing element and a storage element may be integrated into the chip, and the processing element invokes a program stored in a storage element to implement the foregoing methods performed by the access network device. Alternatively, at least one integrated circuit may be integrated into the chip, to implement the foregoing methods performed by the access network device. Alternatively, with reference to the foregoing implementations, functions of some units may be implemented by a program invoked by the processing element, and functions of some units may be implemented by the integrated circuit.

It can be learned that the foregoing apparatus used in the access network device may include at least one processing element and an interface circuit. The at least one processing element is configured to perform any one of the methods performed by the access network device provided in the foregoing method embodiments. The processing element may perform some or all steps performed by the access network device, in a first manner, to be specific, by invoking the program stored in the storage element; or may perform some or all steps performed by the access network device, in a second manner, to be specific, by using a hardware integrated logic circuit in the processing element in combination with instructions; or may certainly perform, by combining the first manner and the second manner, some or all steps performed by the access network device.

As described above, the processing element herein may be a general-purpose processor, for example, a CPU, or may be one or more integrated circuits configured to implement the foregoing methods, for example, one or more ASICs, one or more digital signal processors DSPs, one or more FPGAs, or a combination of at least two of the integrated circuits.

The storage element may be a memory, or may be a general term of a plurality of storage elements.

Figure 13:
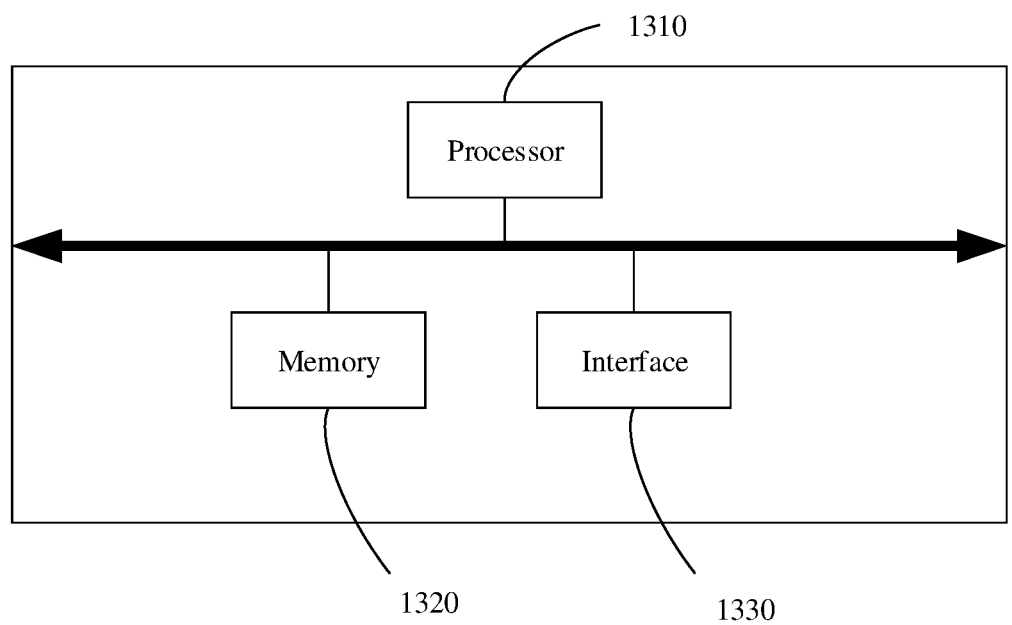
FIG. 13 is a schematic diagram of a structure of a mobility management network element according to an embodiment of this application.

FIG. 13 is a schematic diagram of a structure of a mobility management network element according to an embodiment of this application. The mobility management network element may be the mobility management network element in the foregoing embodiments, and is configured to implement operations of the mobility management network element in the foregoing embodiments. As shown in FIG. 13, the mobility management network element includes a processor 1310, a memory 1320, and an interface 1330. The processor 1310, the memory 1320, and the interface 1330 are signal-connected. Functions of the units may be implemented by the processor 1310 by invoking a program stored in the memory 1320. The processor herein may be an integrated circuit having a signal processing capability, for example, a CPU. Alternatively, functions of the foregoing units may be implemented by one or more integrated circuits configured to implement the foregoing methods, for example, one or more ASICs, one or more digital signal processors DSPs, one or more FPGAs, or a combination of at least two of the integrated circuits. Alternatively, the foregoing implementations may be combined.

A person of ordinary skill in the art may understand that various reference numerals such as "first" and "second" in this application are merely used for differentiation for ease of description, and are not used to limit a scope of the embodiments of this application, or represent a sequence. The term "and/or" describes an association relationship between associated objects and indicates that three relationships may exist. For example, A and/or B may indicate the following three cases: Only A exists, both A and B exist, and only B exists. The character "/" usually indicates an "or" relationship between the associated objects. The term "at least one" means one or more. The term "at least two" means two or more. "At least one", "any one", or a similar expression thereof means any combination of the items, including a singular item (piece) or any combination of plural items (pieces). For example, at least one (piece, or type) of a, b, or c may indicate: a, b, c, a and b, a and c, b and c, or a, b, and c, where a, b, and c may be singular or plural. The term "a plurality of" means two or more, and another quantifier is similar to this. In addition, an element (element) that appears in singular forms "a", "an", and "the" does not mean "one or only one" unless otherwise specified in the context, but means "one or more". For example, "a device" means one or more such devices.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions through a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to the processor, so that the processor can read information from the storage medium and write information to the storage medium. Optionally, the storage medium may alternatively be integrated into the processor. The processor and the storage medium may be disposed in an ASIC.

The computer program instructions may alternatively be loaded onto a computer or another programmable data processing device, so that a series of operations and steps are performed on the computer or another programmable device, to generate computer-implemented processing. Therefore, the instructions executed on the computer or the another programmable device provide steps for implementing a specified function in one or more procedures in the flowcharts and/or in one or more blocks in the block diagrams.

Although this application is described with reference to specific features and the embodiments thereof, it is clear that various modifications and combinations may be made to this application without departing from the spirit and scope of this application. Correspondingly, the specification and the accompanying drawings are merely example descriptions of this application defined by the appended claims, and are intended to cover any of or all modifications, variations, combinations, or equivalents within the scope of this application. Clearly, a person skilled in the art can make various modifications and variations to this application without departing from the scope of this application. This application is intended to cover these modifications and variations of this application provided that they fall within the scope of the claims of this application and their equivalent technologies.

What is claimed is:

1. A method, comprising:
    receiving, by an apparatus, a second random number (RAND) from a mobility management network element, and generating, by the apparatus, a first RAND based on the second RAND and a first key;
    obtaining, by the apparatus, first slice selection assistance information and second slice selection assistance information, wherein the first slice selection assistance information is obtained by encrypting the second slice selection assistance information using a first function and the first RAND, and the second slice selection assistance information is selection assistance information of a slice the apparatus is allowed to access; and
    sending, by the apparatus, a first registration request message to an access network device, wherein the first registration request message comprises the first slice selection assistance information.

2. The method according to claim 1, further comprising:
    before generating, by the apparatus, the first RAND based on the second RAND and the first key, deriving, by the apparatus, the first key based on a locally stored second key.

3. The method according to claim 1, further comprising:
    receiving, by the apparatus, a third RAND from the mobility management network element, wherein the third RAND is used to update the first RAND or the second RAND; and
    performing the following:
        when the third RAND is used to update the first RAND, generating, by the apparatus, third slice selection assistance information based on the second slice selection assistance information, the first function, and the third RAND; or
        when the third RAND is used to update the second RAND, generating, by the apparatus, fourth slice selection assistance information based on the second slice selection assistance information, the first function, the first key, and the third RAND, and updating, by the apparatus, the first slice selection assistance information using the fourth slice selection assistance information.

4. The method according to claim 3, wherein:
    the first function comprises an encryption function; or the first function comprises correspondences between a plurality of RANDs and a plurality of first mappings, wherein each first mapping of the plurality of first mappings comprises:
  mapping relationships between a plurality of pieces of first slice selection assistance information and a plurality of pieces of second slice selection assistance information;
  mapping relationships between a plurality of pieces of third slice selection assistance information and a plurality of pieces of second slice selection assistance information; or
  mapping relationships between a plurality of pieces of fourth slice selection assistance information and a plurality of pieces of second slice selection assistance information.

5. The method according to claim 1, wherein obtaining, by the apparatus, the first slice selection assistance information comprises:
  receiving, by the apparatus, the first slice selection assistance information from a mobility management network element.

6. The method according to claim 5, wherein receiving, by the apparatus, the first slice selection assistance information from the mobility management network element comprises:
  receiving, by the apparatus, a first correspondence from the mobility management network element, wherein the first correspondence comprises a correspondence between the first slice selection assistance information and the second slice selection assistance information.

7. The method according to claim 5, further comprising:
  receiving, by the apparatus, third slice selection assistance information from the mobility management network element, wherein the third slice selection assistance information is used to update the first slice selection assistance information; and
  updating, by the apparatus, the first slice selection assistance information using the third slice selection assistance information.

8. The method according to claim 7, wherein receiving, by the apparatus, the third slice selection assistance information from the mobility management network element comprises:
  receiving, by the apparatus, a second correspondence from the mobility management network element, wherein the second correspondence is between the second slice selection assistance information and the third slice selection assistance information.

9. The method according to claim 7, wherein:
the first function comprises an encryption function; or
the first function comprises correspondences between a plurality of RANDs and a plurality of first mappings, wherein each first mapping of the plurality of first mappings comprises:
  mapping relationships between a plurality of pieces of first slice selection assistance information and a plurality of pieces of second slice selection assistance information;
  mapping relationships between a plurality of pieces of third slice selection assistance information and a plurality of pieces of second slice selection assistance information; or
  mapping relationships between a plurality of pieces of fourth slice selection assistance information and a plurality of pieces of second slice selection assistance information.

10. The method according to claim 5, wherein:
the first function comprises an encryption function; or
the first function comprises correspondences between a plurality of RANDs and a plurality of first mappings, wherein each first mapping comprises:
  mapping relationships between a plurality of pieces of first slice selection assistance information and a plurality of pieces of second slice selection assistance information;
  mapping relationships between a plurality of pieces of third slice selection assistance information and a plurality of pieces of second slice selection assistance information; or
  mapping relationships between a plurality of pieces of fourth slice selection assistance information and a plurality of pieces of second slice selection assistance information.

11. A method, comprising:
receiving, by an access network device, a first registration request message from an apparatus, wherein the first registration request message comprises first slice selection assistance information, the first slice selection assistance information is obtained by encrypting second slice selection assistance information, and the second slice selection assistance information is selection assistance information of a slice the apparatus is allowed to access;
receiving, by the access network device, a first random number (RAND) from a mobility management network element, or receiving, by the access network device, a second RAND and a first key from the mobility management network element, and generating the first RAND based on the second RAND and the first key;
generating, by the access network device, the second slice selection assistance information based on the first slice selection assistance information, a first function, and the first RAND, or generating, by the access network device, the second slice selection assistance information based on the first slice selection assistance information, an inverse function of a first function, and the first RAND; and
sending, by the access network device, a second registration request message to the mobility management network element, wherein the second registration request message comprises the second slice selection assistance information.

12. The method according to claim 11, wherein:
the first function comprises an encryption function; or
the first function comprises correspondences between a plurality of RANDs and a plurality of first mappings, wherein each first mapping of the plurality of first mappings comprises mapping relationships between a plurality of pieces of first slice selection assistance information and a plurality of pieces of second slice selection assistance information.

13. The method according to claim 11, further comprising:
  receiving, by the access network device, a third RAND from the mobility management network element, wherein the third RAND is used to update the first RAND or the second RAND.

14. An apparatus comprising:
a non-transitory memory, configured to store computer executable program code; and
a processor, coupled to the non-transitory memory,
wherein the program code comprises instructions, and when the processor executes the instructions, the instructions cause the apparatus to perform the following operations:

receiving a second random number (RAND) from a mobility management network element, and generating a first RAND based on the second RAND and a first key;

obtaining first slice selection assistance information and second slice selection assistance information, wherein the first slice selection assistance information is obtained by encrypting the second slice selection assistance information using a first function and the first RAND, and the second slice selection assistance information is selection assistance information of a slice the apparatus is allowed to access; and sending a first registration request message to an access network device, wherein the first registration request message comprises the first slice selection assistance information.

15. The apparatus according to claim 14, wherein when the processor executes the instructions, the instructions further cause the apparatus to perform the following operations:

before generating the first RAND based on the second RAND and the first key, deriving the first key based on a locally stored second key.

16. The apparatus according to claim 14, wherein when the processor executes the instructions, the instructions further cause the apparatus to perform the following operations:

receiving a third RAND from the mobility management network element, wherein the third RAND is used to update the first RAND or the second RAND; and performing the following:

when the third RAND is used to update the first RAND, generating third slice selection assistance information based on the second slice selection assistance information, the first function, and the third RAND; or when the third RAND is used to update the second RAND, generating fourth slice selection assistance information based on the second slice selection assistance information, the first function, the first key, and the third RAND, and updating the first slice selection assistance information using the fourth slice selection assistance information.

17. The apparatus according to claim 14, wherein:

the first function comprises an encryption function; or the first function comprises correspondences between a plurality of RANDs and a plurality of first mappings, wherein each first mapping of the plurality of first mappings comprises:

mapping relationships between a plurality of pieces of first slice selection assistance information and a plurality of pieces of second slice selection assistance information;

mapping relationships between a plurality of pieces of third slice selection assistance information and a plurality of pieces of second slice selection assistance information; or mapping relationships between a plurality of pieces of fourth slice selection assistance information and a plurality of pieces of second slice selection assistance information.

18. The apparatus according to claim 14, wherein obtaining the first slice selection assistance information comprises:

receiving the first slice selection assistance information from a mobility management network element.

19. The apparatus according to claim 18, wherein receiving the first slice selection assistance information from the mobility management network element comprises:

receiving a first correspondence from the mobility management network element, wherein the first correspondence comprises a correspondence between the first slice selection assistance information and the second slice selection assistance information.

20. The apparatus according to claim 18, wherein the instructions further cause the apparatus to perform the following operations:

receiving third slice selection assistance information from the mobility management network element, wherein the third slice selection assistance information is used to update the first slice selection assistance information; and updating the first slice selection assistance information using the third slice selection assistance information.

* * * * *